(12) United States Patent
Berry

(10) Patent No.: US 11,248,794 B2
(45) Date of Patent: Feb. 15, 2022

(54) FLUID MIXING APPARATUS USING LIQUID FUEL AND HIGH- AND LOW-PRESSURE FLUID STREAMS

(71) Applicant: General Electric Company, Schenectady, NY (US)

(72) Inventor: Jonathan Dwight Berry, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/731,306

(22) Filed: Dec. 31, 2019

(65) Prior Publication Data

US 2021/0199300 A1    Jul. 1, 2021

(51) Int. Cl.
*F23R 3/28*    (2006.01)
*F02C 3/30*    (2006.01)
(Continued)

(52) U.S. Cl.
CPC ............... *F23R 3/286* (2013.01); *F02C 3/30* (2013.01); *F02C 7/22* (2013.01); *F23R 3/36* (2013.01);
(Continued)

(58) Field of Classification Search
CPC combination set(s) only.
See application file for complete search history.

(56) References Cited

U.S. PATENT DOCUMENTS

| 4,192,139 A | 3/1980 | Buchheim |
| 8,769,955 B2 * | 7/2014 | Van Nieuwenhuizen ................... F23R 3/346 60/740 |

(Continued)

FOREIGN PATENT DOCUMENTS

| EP | 2039418 A1 | 3/2009 |
| EP | 2639508 A2 | 9/2013 |

(Continued)

OTHER PUBLICATIONS

TankJet—Operating Principle Demo of the TankJet® B and BX Injectors by Spraying Systems Co, YouTube—Uploaded Jun. 24, 2011, extracted Jun. 2, 2021 <https://www.youtube.com/watch?v=ilBsLnwGIUg> (Year: 2011).*

(Continued)

*Primary Examiner* — Craig Kim
(74) *Attorney, Agent, or Firm* — Dority & Manning, P.A.

(57) ABSTRACT

A fluid mixing apparatus includes mixing conduits that extend through a fluid plenum. The fluid plenum, which surrounds a first wall defining a main passage fluidly coupled to a low-pressure fluid source, is surrounded itself by a second wall defining a high-pressure plenum fluidly coupled to a high-pressure fluid source. An insulated tube disposed at the inlet of the first wall delivers a third fluid. The mixing conduits fluidly couple the high-pressure plenum to the main passage, where the high-pressure fluid is mixed with low-pressure fluid and the third fluid. Optionally, the fluid plenum may house a fourth fluid that is injected (Continued)

through injection holes in the mixing conduits. The fluid mixing apparatus may be used to mix one or more fuels with high- and low-pressure air in a gas turbine combustor. Alternately, the fluid mixing apparatus may mix a fluid with high- and low-pressure water streams.

16 Claims, 18 Drawing Sheets

(51) Int. Cl.
 *F02C 7/22* (2006.01)
 *F23R 3/36* (2006.01)
 *F23R 3/50* (2006.01)
 *F23R 3/34* (2006.01)
(52) U.S. Cl.
 CPC .................. *F23R 3/50* (2013.01); *F23R 3/34* (2013.01); *F23R 3/346* (2013.01)

(56) References Cited

U.S. PATENT DOCUMENTS

| | | | |
|---|---|---|---|
| 9,212,609 B2 | 12/2015 | Twardochleb et al. | |
| 9,551,490 B2* | 1/2017 | DiCintio | F23R 3/283 |
| 10,436,450 B2* | 10/2019 | Crawley | F23R 3/286 |
| 10,513,987 B2* | 12/2019 | Hughes | F23R 3/34 |
| 2009/0113893 A1 | 5/2009 | Li et al. | |
| 2010/0150797 A1 | 6/2010 | Fujiyama et al. | |
| 2013/0186982 A1* | 7/2013 | Vidusek | B05B 1/26 239/429 |
| 2013/0239575 A1 | 9/2013 | Chen et al. | |
| 2014/0116053 A1* | 5/2014 | Chen | F23R 3/045 60/737 |
| 2014/0260269 A1* | 9/2014 | Davis, Jr. | F23R 3/286 60/737 |
| 2015/0198332 A1* | 7/2015 | DiCintio | F23R 3/20 60/740 |
| 2015/0285501 A1* | 10/2015 | DiCintio | F23R 3/283 60/740 |
| 2015/0285504 A1* | 10/2015 | Melton | B23K 26/702 60/737 |
| 2016/0177834 A1 | 6/2016 | Patel et al. | |
| 2017/0268784 A1* | 9/2017 | Crawley | F23R 3/286 |
| 2017/0276360 A1 | 9/2017 | Berry et al. | |
| 2017/0276366 A1* | 9/2017 | Berry | F23R 3/34 |
| 2018/0187607 A1* | 7/2018 | Hughes | F23R 3/346 |
| 2018/0328587 A1* | 11/2018 | Gubba | F23R 3/002 |
| 2018/0328588 A1* | 11/2018 | Lemon | F23R 3/36 |
| 2018/0340689 A1* | 11/2018 | Woodlock | F23R 3/002 |
| 2019/0128521 A1* | 5/2019 | Han | F23R 3/002 |
| 2019/0178496 A1* | 6/2019 | Jones | F23R 3/002 |
| 2019/0178498 A1* | 6/2019 | Wilson | F23R 3/045 |
| 2019/0301738 A1* | 10/2019 | North | F23R 3/002 |
| 2020/0141251 A1* | 5/2020 | Folkers | F23R 3/46 |
| 2020/0141253 A1* | 5/2020 | Morisawa | F01D 25/30 |
| 2021/0199298 A1* | 7/2021 | Berry | F23R 3/10 |
| 2021/0199300 A1* | 7/2021 | Berry | B01F 5/0428 |

FOREIGN PATENT DOCUMENTS

| | | | |
|---|---|---|---|
| EP | 3037729 A1 | 6/2016 | |
| WO | WO 03084867 A1 | 10/2003 | |

OTHER PUBLICATIONS

European Search Report Corresponding to EP20204208.1 dated Apr. 14, 2021.

* cited by examiner

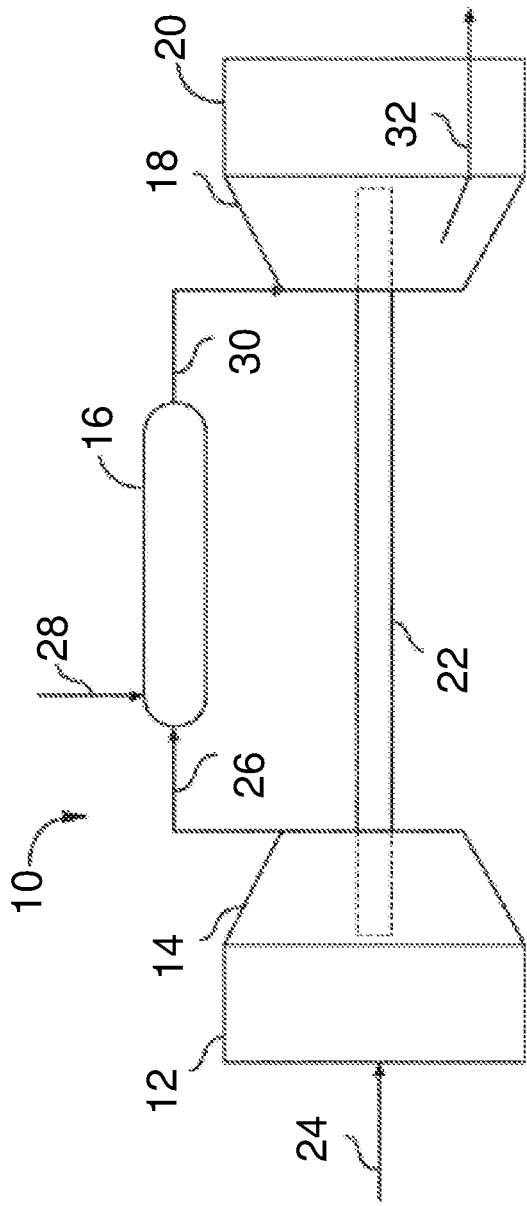
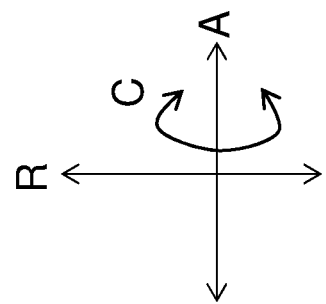
FIG. 4

— FIG. 6 —

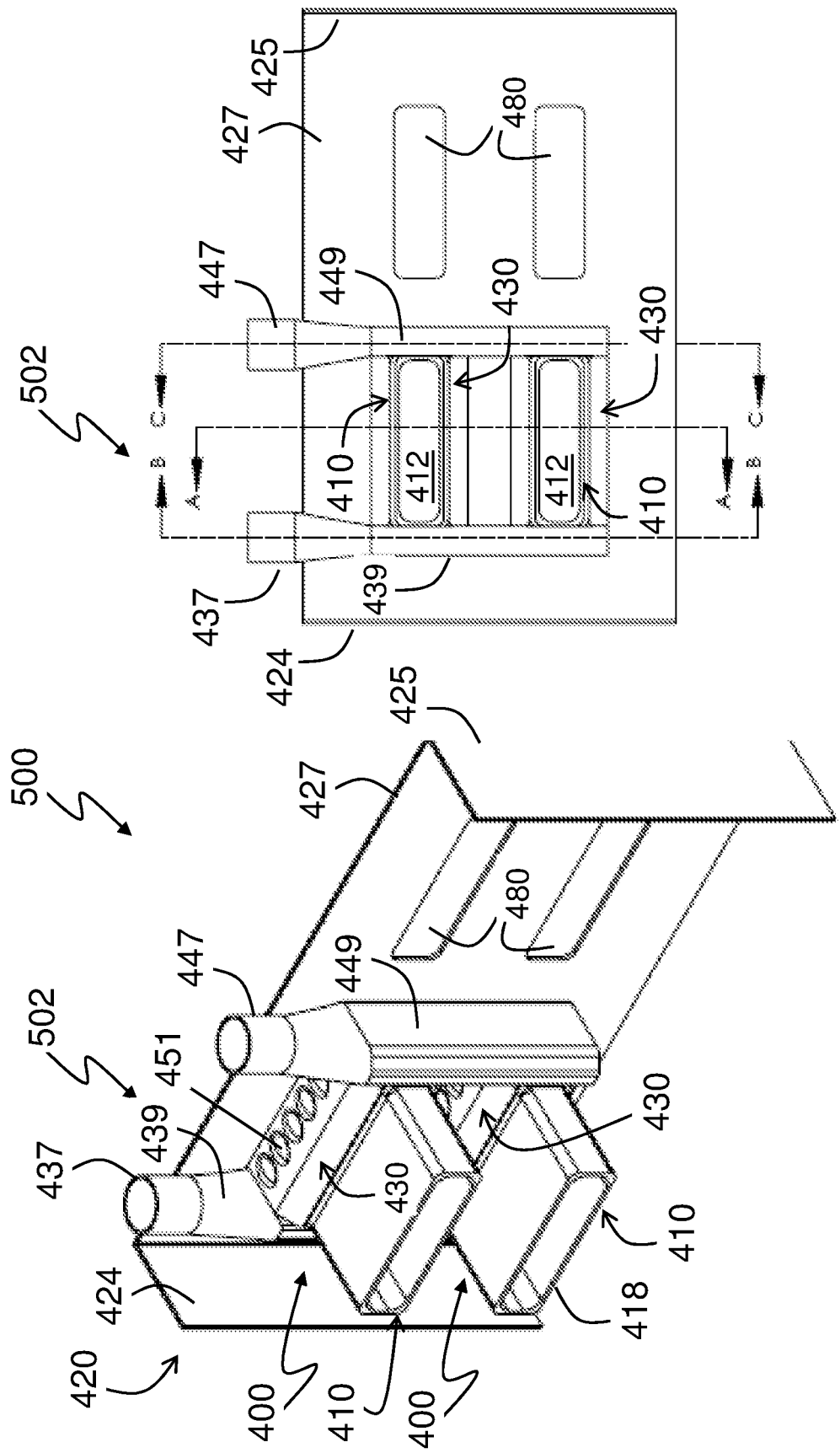

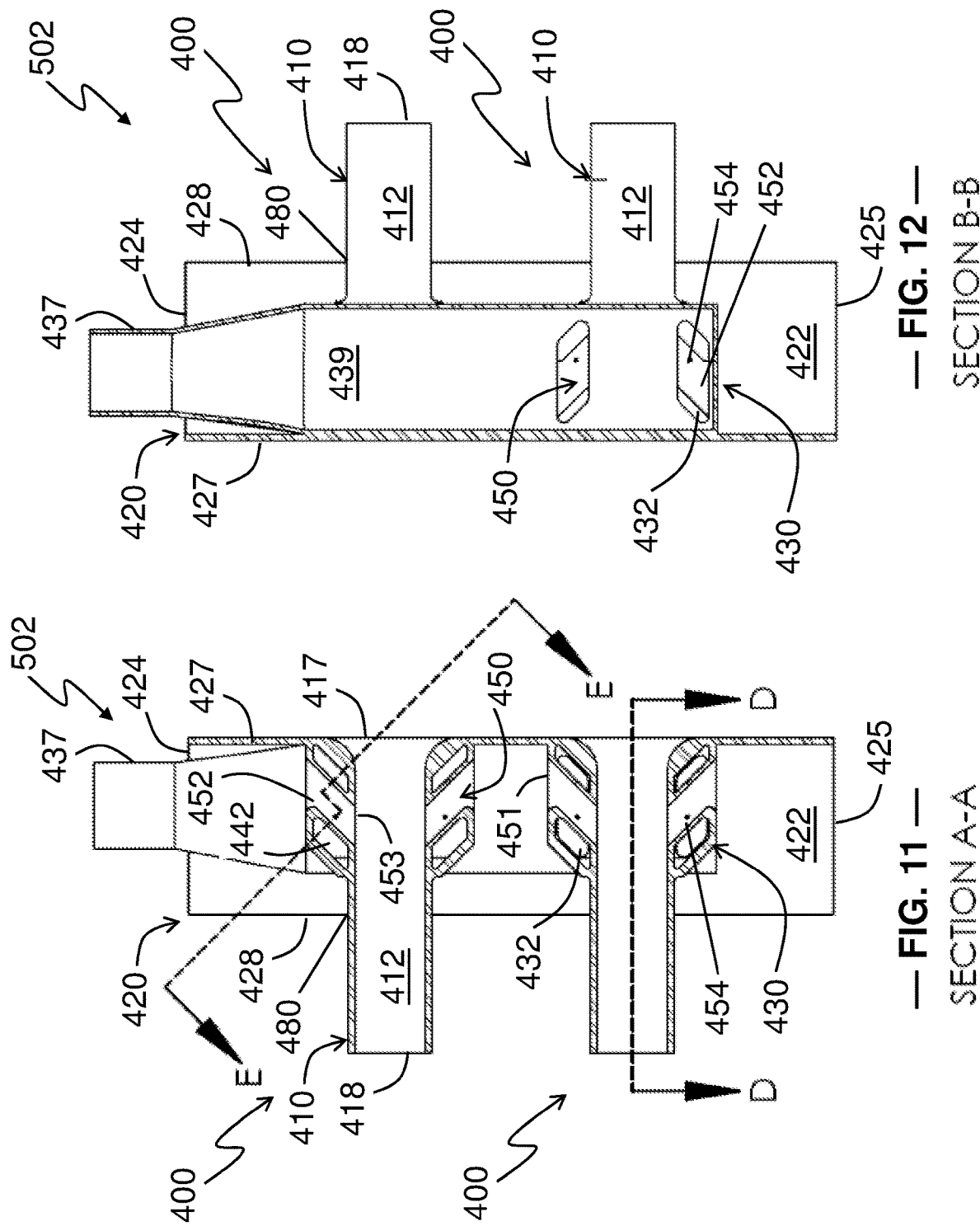

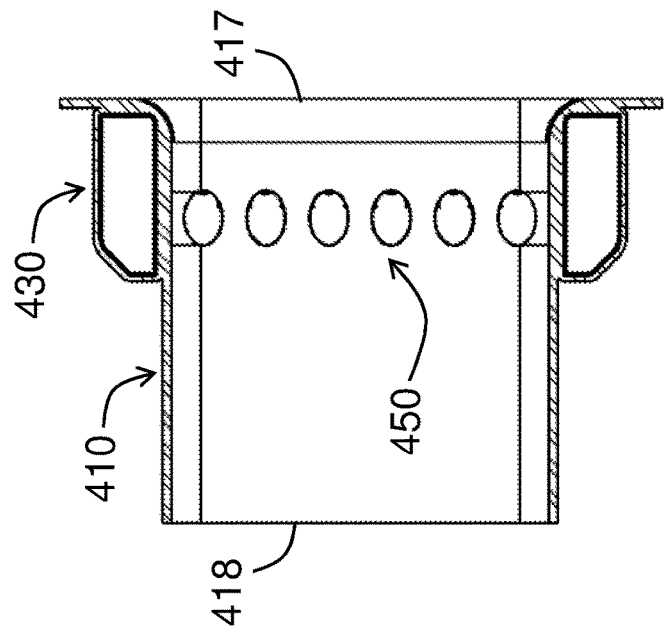
— FIG. 14 —
SECTION D-D
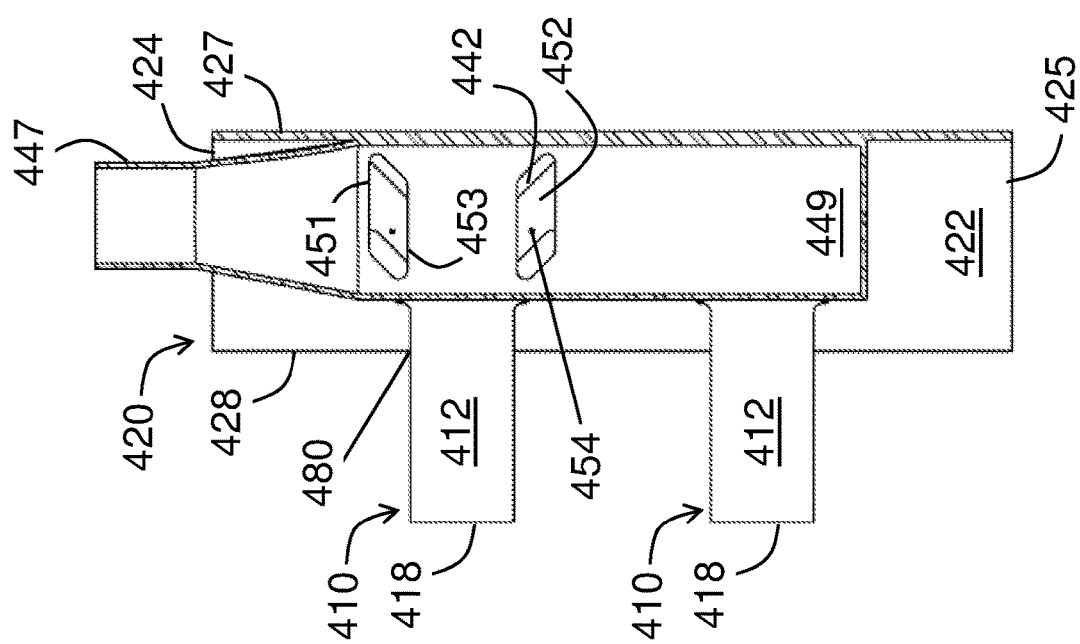
— FIG. 13 —
SECTION C-C

DETAIL F

SECTION E-E

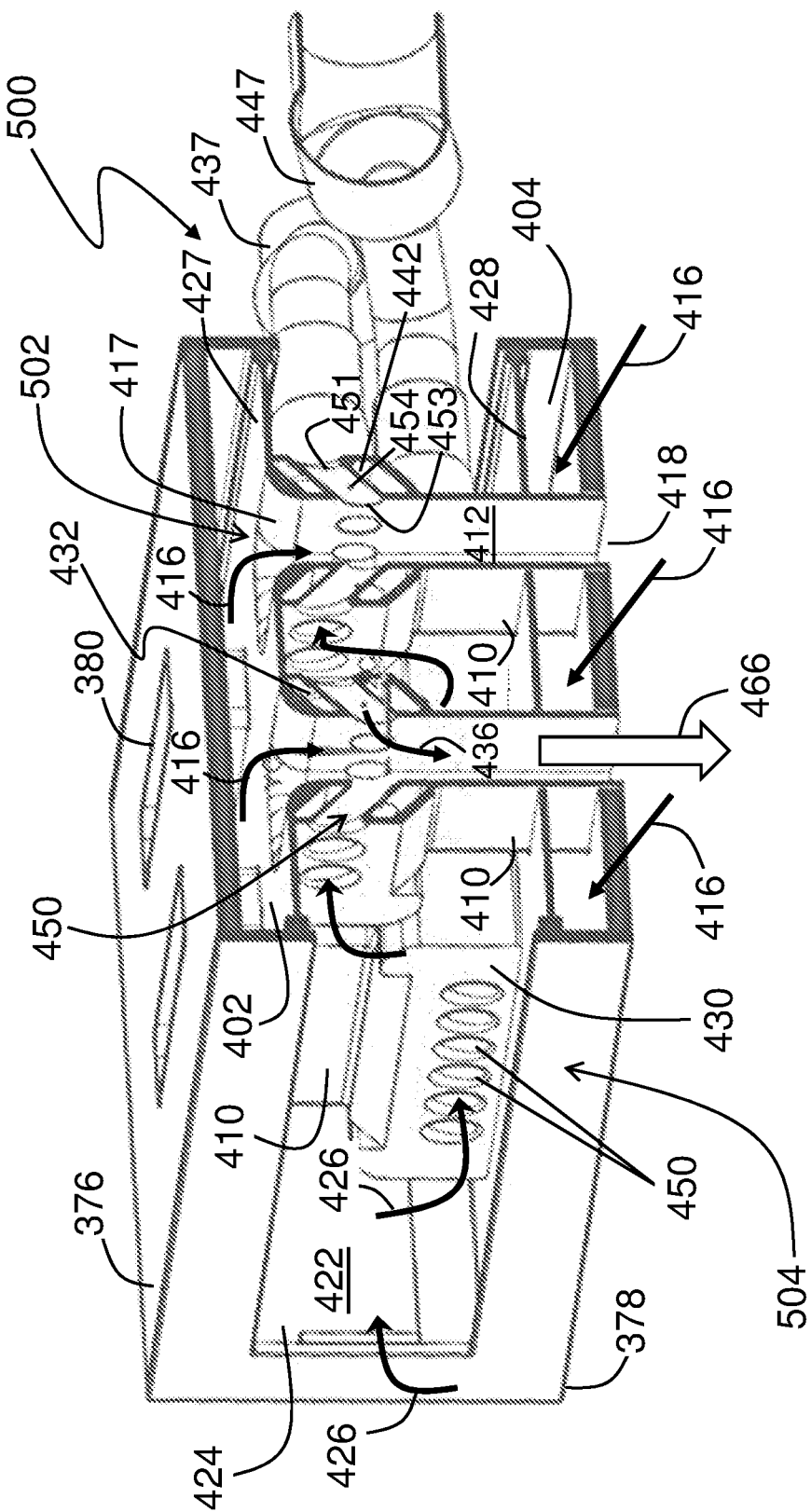
— FIG. 17 —

— FIG. 19 —

FLUID MIXING APPARATUS USING LIQUID FUEL AND HIGH- AND LOW-PRESSURE FLUID STREAMS

STATEMENT REGARDING GOVERNMENT RIGHTS

The inventions disclosed herein were made with government support under contract number DE-FE0023965 awarded by the United States Department Of Energy (DOE). The United States Government has certain rights in this invention.

TECHNICAL FIELD

The present disclosure relates generally to the field of fluid mixing apparatuses and, more particularly, to fluid mixing apparatuses that use high-pressure and low-pressure fluid streams of a first fluid to promote mixing with a second, different fluid. In one embodiment, such a fluid mixing apparatus may be used to introduce a fuel/air mixture through a combustor liner of a gas turbine combustor as part of an axially staged fuel delivery system.

BACKGROUND

Some conventional turbo machines, such as gas turbine systems, are utilized to generate electrical power. In general, gas turbine systems include a compressor, one or more combustors, and a turbine. Air may be drawn into a compressor, via its inlet, where the air is compressed by passing through multiple stages of rotating blades and stationary nozzles. The compressed air is directed to the one or more combustors, where fuel is introduced, and a fuel/air mixture is ignited and burned to form combustion products. The combustion products function as the operational fluid of the turbine.

The operational fluid then flows through a fluid flow path in a turbine, the flow path being defined between a plurality of rotating blades and a plurality of stationary nozzles disposed between the rotating blades, such that each set of rotating blades and each corresponding set of stationary nozzles defines a turbine stage. As the plurality of rotating blades rotate the rotor of the gas turbine system, a generator, coupled to the rotor, may generate power from the rotation of the rotor. The rotation of the turbine blades also causes rotation of the compressor blades, which are coupled to the rotor.

When introducing the fuel and air into the combustor for burning, it has been found that mixing the fuel and air before delivery into the combustion zone (i.e., "pre-mixing") reduces the formation of nitrous oxides and other pollutants. Further reductions in emissions can be achieved by introducing some fuel through the fuel nozzles at the upstream end of the combustor and additional fuel through one or more axially spaced stages along the length of the combustor. The fuel nozzles at the upstream, or head, end of the combustor introduce the fuel in an axial direction, while the staged fuel nozzles introduce fuel in a radial or transverse direction relative to the flow of combustion products from the upstream end.

In some circumstances, it may be desirable to burn liquid fuel instead of, or in addition to, gaseous fuel. The introduction of liquid fuel requires care to prevent coking of the liquid fuel nozzles and to prevent the liquid fuel from wetting the adjacent walls, which can contribute to coking along the walls. Such wall coking can lead to undesirable temperature increases in the combustor liner, which may shorten the service life of the liner.

Accordingly, improvements in the devices used to mix fluid streams (e.g., fuel and air) are needed.

SUMMARY

A fluid mixing apparatus includes mixing conduits that extend through a fluid plenum. The fluid plenum, which surrounds a first wall defining a main passage fluidly coupled to a low-pressure fluid source, is surrounded itself by a second wall defining a high-pressure plenum fluidly coupled to a high-pressure fluid source. An insulated tube disposed at the inlet of the first wall delivers a third fluid. The mixing conduits fluidly couple the high-pressure plenum to the main passage, where the high-pressure fluid is mixed with low-pressure fluid and the third fluid. Optionally, the fluid plenum may house a fourth fluid that is injected through injection holes in the mixing conduits. The fluid mixing apparatus may be used to mix one or more fuels with high- and low-pressure air in a gas turbine combustor. Alternately, the fluid mixing apparatus may mix a fluid with high- and low-pressure water streams.

BRIEF DESCRIPTION OF THE DRAWINGS

The specification, directed to one of ordinary skill in the art, sets forth a full and enabling disclosure of the present system and method, including the best mode of using the same. The specification refers to the appended figures, in which:

FIG. 4 is a schematic cross-sectional view of a gas turbine which may employ fluid mixing apparatuses, as described herein;

FIG. 9 is a perspective view of a fluid mixing apparatus, as may be used in the integrated combustor nozzle of FIG. 8, according to another aspect of the present disclosure;

FIG. 10 is a plan view of the portion of the fluid mixing apparatus of FIG. 9;

FIG. 11 is a cross-sectional view of the fluid mixing apparatus of FIG. 9, as taken along line A-A of FIG. 10;

FIG. 12 is a cross-sectional view of the fluid mixing apparatus of FIG. 9, as taken along line B-B of FIG. 10;

FIG. 13 is a cross-sectional view of the fluid mixing apparatus of FIG. 9, as taken along line C-C of FIG. 10;

FIG. 14 is a cross-sectional view of the fluid mixing apparatus of FIG. 9, as taken along line D-D of FIG. 11;

FIG. 17 is a perspective partial cross-sectional view of a pair of oppositely disposed fluid mixing apparatuses of FIG. 9;

DETAILED DESCRIPTION

Figure 1:
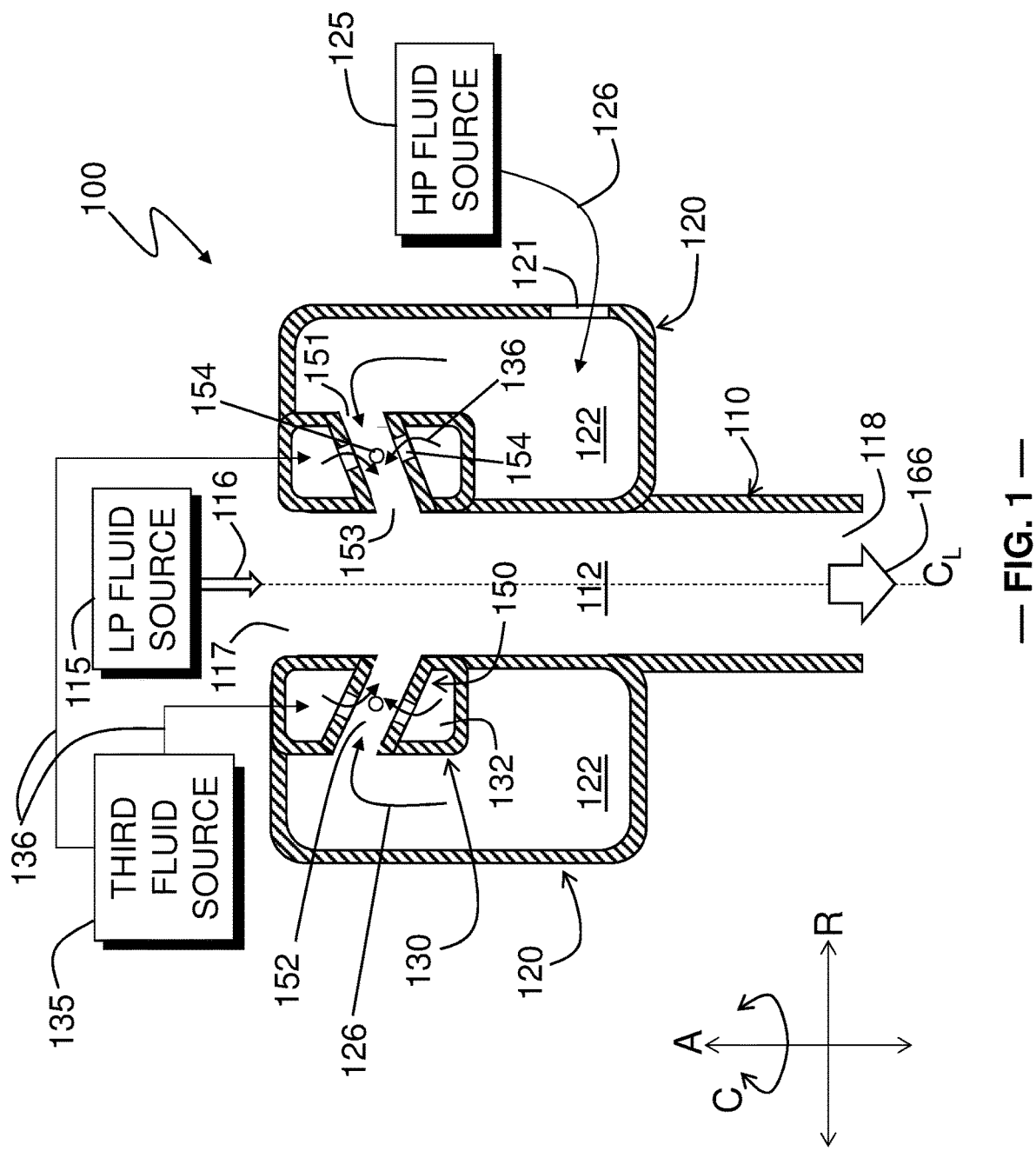
FIG. 1 is a schematic cross-sectional view of a fluid mixing apparatus for mixing three fluid streams, according to a first aspect of the present disclosure.

Reference will now be made in detail to various embodiments of the present disclosure, one or more examples of which are illustrated in the accompanying drawings. The detailed description uses numerical and letter designations to refer to features in the drawings. Like or similar designations in the drawings and description have been used to refer to like or similar parts of the disclosure.

To clearly describe the current fluid mixing apparatus, which uses high- and low-pressure fluid streams, certain terminology will be used to refer to and describe relevant components within the scope of this disclosure. To the extent possible, common industry terminology will be used and employed in a manner consistent with the accepted meaning of the terms. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single integrated part.

In addition, several descriptive terms may be used regularly herein, as described below. The terms "first", "second", and "third" may be used interchangeably to distinguish one component from another and are not intended to signify location or importance of the individual components.

As used herein, "downstream" and "upstream" are terms that indicate a direction relative to the flow of a fluid, such as the fluid through the fluid mixing apparatus. The term "downstream" corresponds to the direction of flow of the fluid, and the term "upstream" refers to the direction opposite to the flow (i.e., the direction from which the fluid flows). The terms "forward" and "aft," without any further specificity, refer to relative position, with "forward" being used to describe components or surfaces located toward the front (or compressor) end of the engine or toward the inlet end of the combustor, and "aft" being used to describe components located toward the rearward (or turbine) end of the engine or toward the outlet end of the combustor. The term "inner" is used to describe components in proximity to the turbine shaft, while the term "outer" is used to describe components distal to the turbine shaft.

It is often required to describe parts that are at differing radial, axial and/or circumferential positions. As shown in FIG. 1, the "A" axis represents an axial orientation. As used herein, the terms "axial" and/or "axially" refer to the relative position/direction of objects along axis A. As further used herein, the terms "radial" and/or "radially" refer to the relative position or direction of objects along an axis "R", which intersects axis A at only one location. In some embodiments, axis R is substantially perpendicular to axis A. Finally, the term "circumferential" refers to movement or position around axis A (e.g., axis "C"). The term "circumferential" may refer to a dimension extending around a center of a respective object (e.g., a fluid mixing apparatus).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

Although exemplary embodiments of the present disclosure will be described generally in the context of delivering a well-mixed fuel-air mixture for combustion in a land-based power-generating gas turbine for purposes of illustration, one of ordinary skill in the art will readily appreciate that embodiments of the present disclosure may be applied to other locations within a turbomachine and are not limited to turbine components for land-based power-generating gas turbines, unless specifically recited in the claims.

Referring now to the drawings, FIG. 1 schematically illustrates a fluid mixing apparatus 100, according to a first aspect of the present disclosure. The fluid mixing apparatus 100 includes a first annular wall 110 that defines a main passage 112 in fluid communication with a low-pressure fluid source 115. The first annular wall 110 has an upstream end that defines an inlet 117 for a low-pressure fluid 116 and a downstream end that defines an outlet 118 of the fluid mixing apparatus 100. The first annular wall 110 may be a cylinder or may have a radial cross-section defining a non-circular shape, such as an elliptical shape, a racetrack shape, or a polygonal shape (e.g., a rectangular shape).

A second annular wall 120 circumscribes at least an upstream end of the first annular wall 110 and defines a plenum 122 in fluid communication with a high-pressure fluid source 125. For example, a high-pressure fluid 126 from the high-pressure fluid source 125 may be directed through one or more apertures 121 in the second annular wall 120 to fill the plenum 122. In one embodiment, the low-pressure fluid 116 and the high-pressure fluid 126 are the same fluid.

A third annular wall 130 is nested within the plenum 122 and is surrounded by the second annular wall 120. The third annular wall 130 defines a plenum 132 in fluid communication with a third fluid source 135. The third annular wall 130 circumscribes the first annular wall 110.

Each of one or more mixing conduits 150, which extend through the plenum 132, has an inlet 151 that is fluidly connected to the plenum 122 and an outlet 153 that is fluidly connected with the main passage 112. One or more injection holes 154 are defined through each mixing conduit 150 and are in fluid communication with the plenum 132 defined by the third annular wall 130. The third fluid 136 flows through the one or more injection holes 154 into a passage 152 defined by each mixing conduit 150.

In one embodiment, the mixing conduits 150 are oriented at an angle relative to an axial centerline $C_L$ of the fluid mixing apparatus 100. Preferably, the mixing conduits 150 are oriented at an angle to direct the flow therethrough in a downstream direction (i.e., toward the outlet 118). The mixing conduits 150 (individually) are shorter and of smaller diameter than the first annular wall 110.

In operation, the high-pressure fluid 126 from the high-pressure fluid source 125 flows through the plenum 122 and into the passages 152, while the third fluid 136 flows through the one or more injection holes 154 into the passages 152. The pressure of the high-pressure fluid 126 rapidly carries the third fluid 136 into the main passage 112 defined by the first annular wall 110, where the high-pressure fluid 126 draws the low-pressure fluid 116 into the inlet 117 of the main passage 112. Within the main passage 112, the low-pressure fluid 116, the high-pressure fluid 126, and the third fluid 136 are mixed to produce a mixed fluid stream 166 that exits from the outlet 118 of the fluid mixing apparatus 100.

Figure 2:
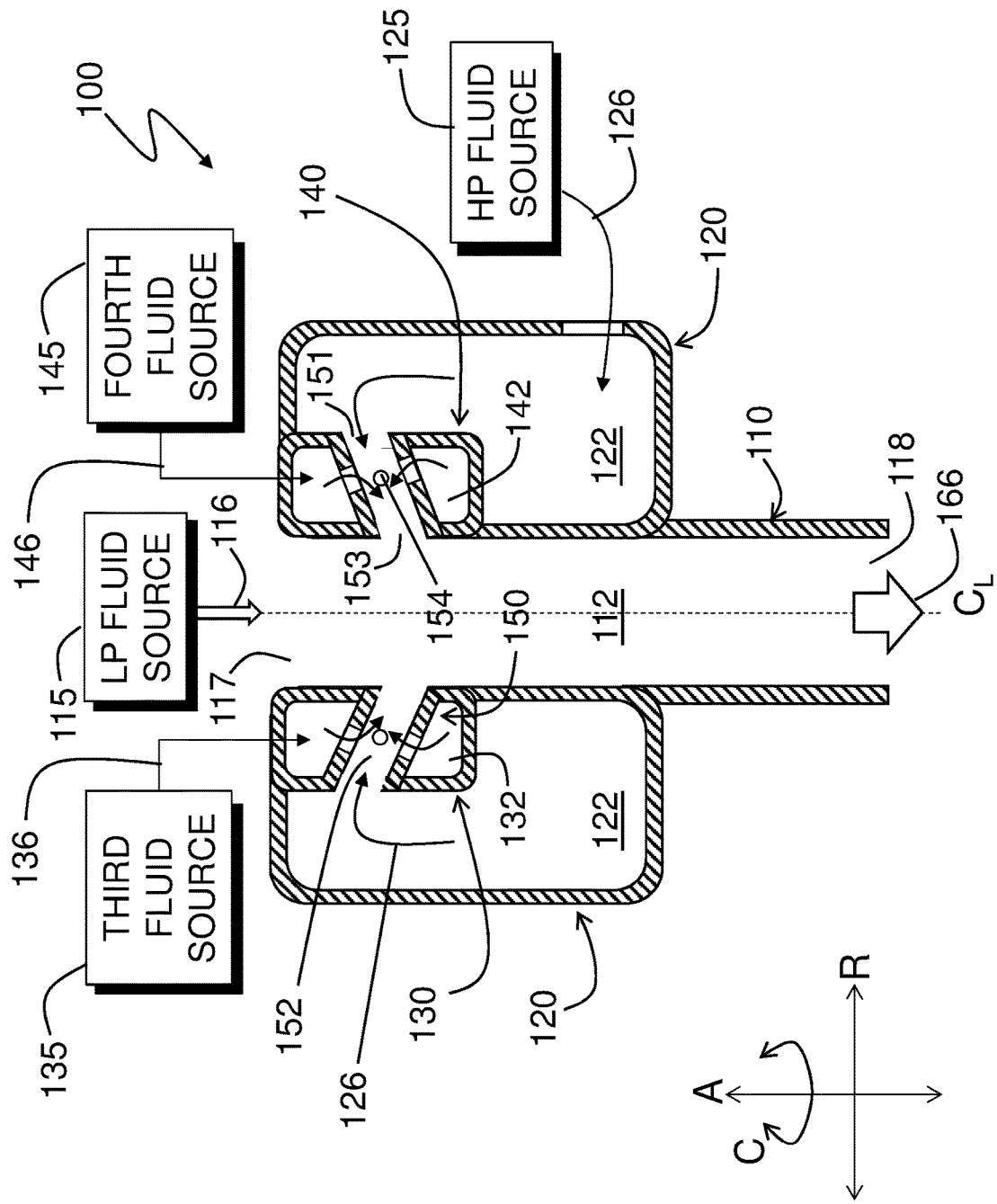
FIG. 2 is a schematic cross-sectional view of an alternate embodiment of the fluid mixing apparatus of FIG. 1.

FIG. 2 schematically illustrates an alternate embodiment of the fluid mixing apparatus 100 of FIG. 1, in which the plenum 132 is divided into a first plenum 132 and a second plenum 142. The third fluid source 135 supplies the third fluid 136 to the first plenum 132, which is located on one side of the fluid mixing apparatus 100. A fourth fluid source 145 supplies a fourth fluid 146 to the second plenum 142, which is located on the opposite side of the fluid mixing apparatus 100 from the first plenum 132. The third fluid 136 and the fourth fluid 146 may be the same fluid, or the third fluid 136 may be different from the fourth fluid 146. For example, the third fluid 136 and the fourth fluid 146 may have different Wobbe indexes. The flow rate and/or the number of injection holes 154 in the mixing conduits 150 may be varied. Further discussion of the separately fueled plenums 132, 142 will follow with reference to FIGS. 9 through 11.

Figure 3:
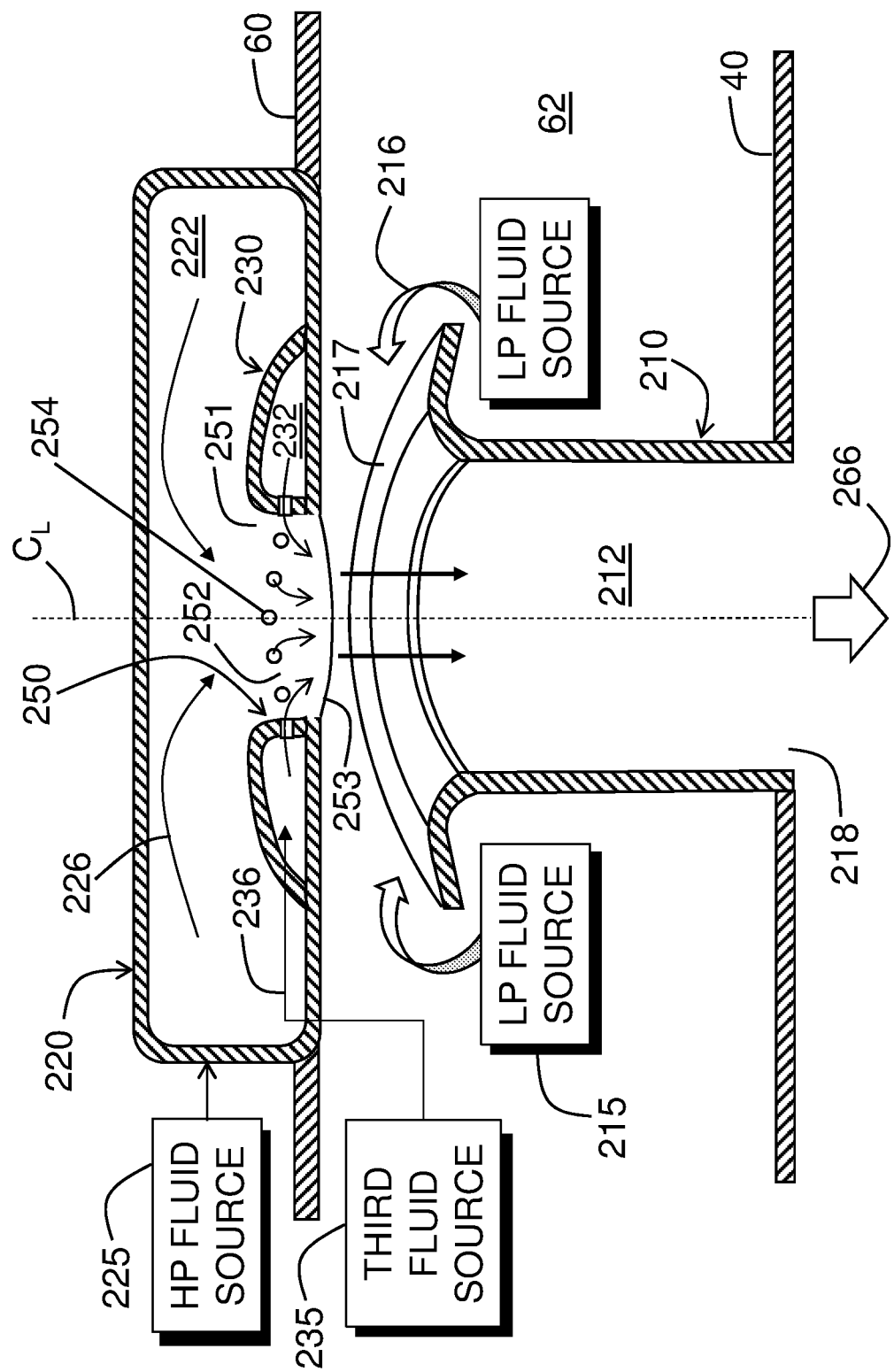
FIG. 3 is a schematic cross-sectional view of a fluid mixing apparatus for mixing three fluid streams, according to a second aspect of the present disclosure.

FIG. 3 schematically illustrates a fluid mixing apparatus 200, according to a second aspect of the present disclosure. The fluid mixing apparatus 200 includes a first annular wall 210 that defines a main passage 212 in fluid communication with a low-pressure fluid source 215. The first annular wall 210 has an upstream end that defines an inlet 217 for a low-pressure fluid 216 and a downstream end that defines an outlet 218 of the fluid mixing apparatus 200. The inlet 217 may define a bell-mouth shape to facilitate introduction of the low-pressure fluid 216 into the main passage 212.

A second annular wall 220 is disposed radially upstream of the inlet 217 of the first annular wall 210 and defines a plenum 222 in fluid communication with a high-pressure fluid source 225. For example, a high-pressure fluid 226 from the high-pressure fluid source 225 may be directed through one or more apertures (not shown) in the second annular wall 220 to fill the plenum 222.

A third annular wall 230 is nested within the plenum 222 and is surrounded by the second annular wall 220. The third annular wall 230 defines a plenum 232 in fluid communication with a third fluid source 235.

A mixing conduit 250, which extends through the plenum 232, includes an inlet 251 in fluid communication with the plenum 222 and an outlet 253 that directs flow into the main passage 212 defined by the first annular wall 210. One or more injection holes 254 are defined through the mixing conduit 250 and are in fluid communication with the plenum 232 defined by the third annular wall 230. The third fluid 236 flows through the one or more injection holes 254 into a passage 252 defined by the mixing conduit 250. The mixing conduit 250 is oriented to direct the flow therethrough in a downstream direction (i.e., toward the outlet 218).

In operation, the high-pressure fluid 226 from the high-pressure fluid source 226 flows through the plenum 222 and into the passage 252, while the third fluid 236 flows through the one or more injection holes 254 into the passage 252. The pressure of the high-pressure fluid 226 rapidly carries the third fluid 236 in a downstream direction into the main passage 212 defined by the first annular wall 210, where the pressure of the high-pressure fluid 226 helps to draw the low-pressure fluid 216 into the inlet 217 of the main passage 212. Within the main passage 212, the low-pressure fluid 216, the high-pressure fluid 226, and the third fluid 236 are mixed to produce a mixed fluid stream 266 that exits from the outlet 218 of the fluid mixing apparatus 210.

The fluid mixing apparatus 200 may be used in a combustion section 16 of a gas turbine 10, as shown in FIGS. 4 through 8. As will be discussed below with reference to a can-annular combustor (shown in FIGS. 5 and 6), the first annular wall 210 may be mounted to the outer surface of a combustor liner 40, while the second annular wall 220, third annular wall 230, and the mixing conduit 250 are mounted to the outer surface of a combustor flow sleeve 60. The low-pressure fluid 216 may be conveyed through an annulus 62 between the combustor liner 40 and the flow sleeve 60.

FIG. 4 schematically illustrates an exemplary gas turbine 10. The gas turbine 10 generally includes an inlet section 12, a compressor 14 disposed downstream of the inlet section 12, a combustion section 16 disposed downstream of the compressor 14, a turbine 18 disposed downstream of the combustion section 16, and an exhaust section 20 disposed downstream of the turbine 18. Additionally, the gas turbine 10 may include one or more shafts 22 (also known as "rotors") that couple the compressor 14 to the turbine 18.

During operation, air 24 flows through the inlet section 12 and into the compressor 14, where the air 24 is progressively compressed, thus providing compressed air 26 to the combustion section 16. At least a portion of the compressed air 26 is mixed with a fuel 28 within the combustion section 16 and burned to produce combustion gases 30. The combustion gases 30 flow from the combustion section 16 to into the turbine 18, where thermal and/or kinetic energy are transferred from the combustion gases 30 to rotor blades (not shown) attached to the shaft 22, thereby causing the shaft 22 to rotate. The mechanical rotational energy may then be used for various purposes, such as to power the compressor 14 and/or to generate electricity, via a generator 21 coupled to the shaft 22. The energy-depleted combustion gases 32 exiting the turbine 18 may then be exhausted from the gas turbine 10, via the exhaust section 20.

Figure 5:
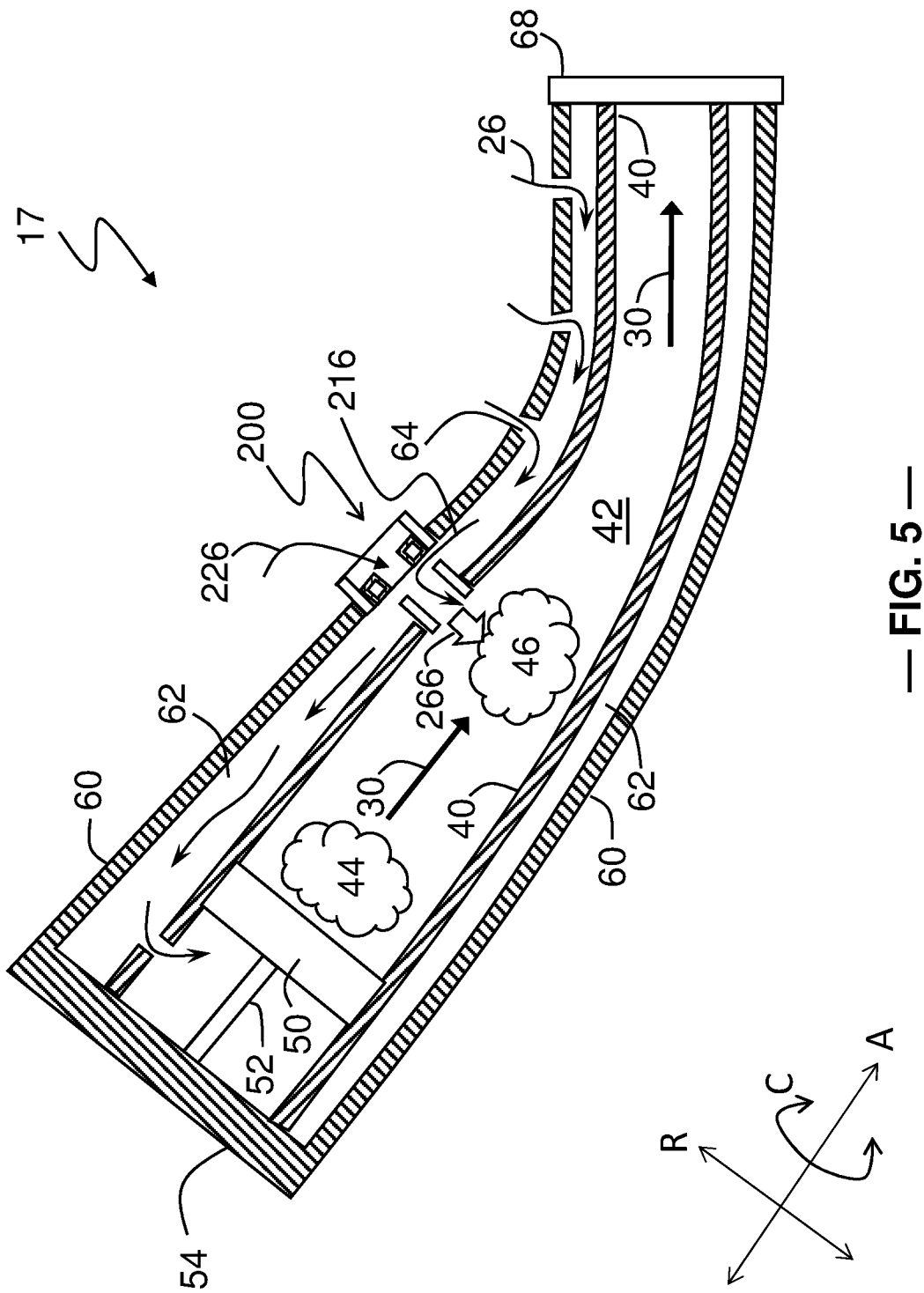
FIG. 5 is a schematic side cross-sectional view of a can-annular combustor, which includes the fluid mixing apparatus of FIG. 3.
Figure 6:
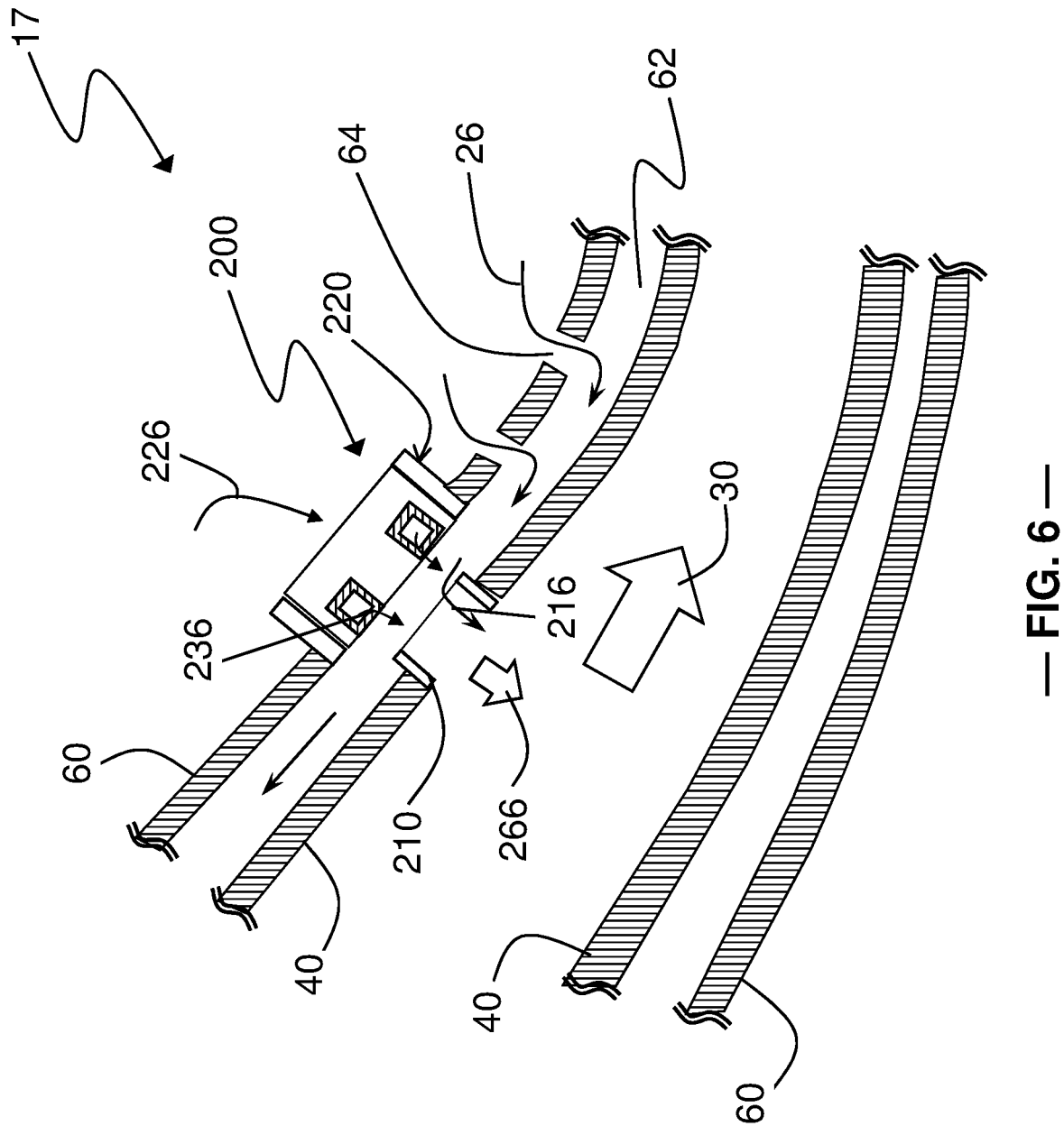
FIG. 6 is a schematic side cross-sectional view of a portion of a can-annular combustor, as in FIG. 5, that includes the fluid mixing apparatus of FIG. 3.
Figure 7:
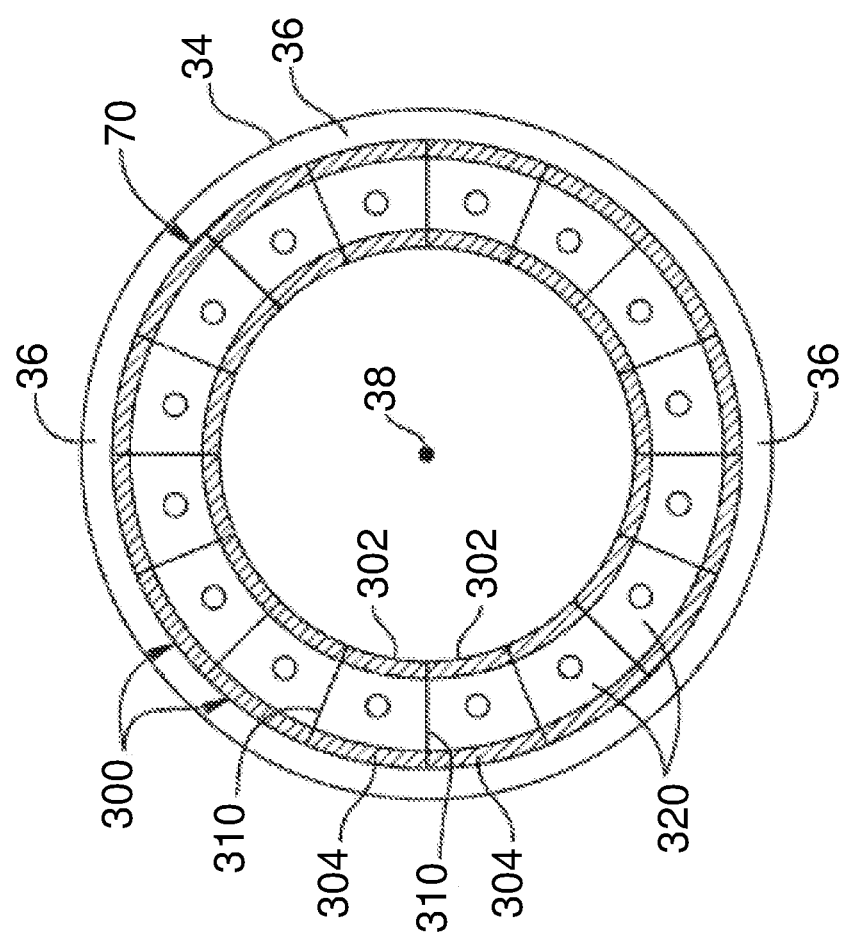
FIG. 7 is an upstream view of an exemplary segmented annular combustor, which may employ fluid mixing apparatuses as described herein.
Figure 8:
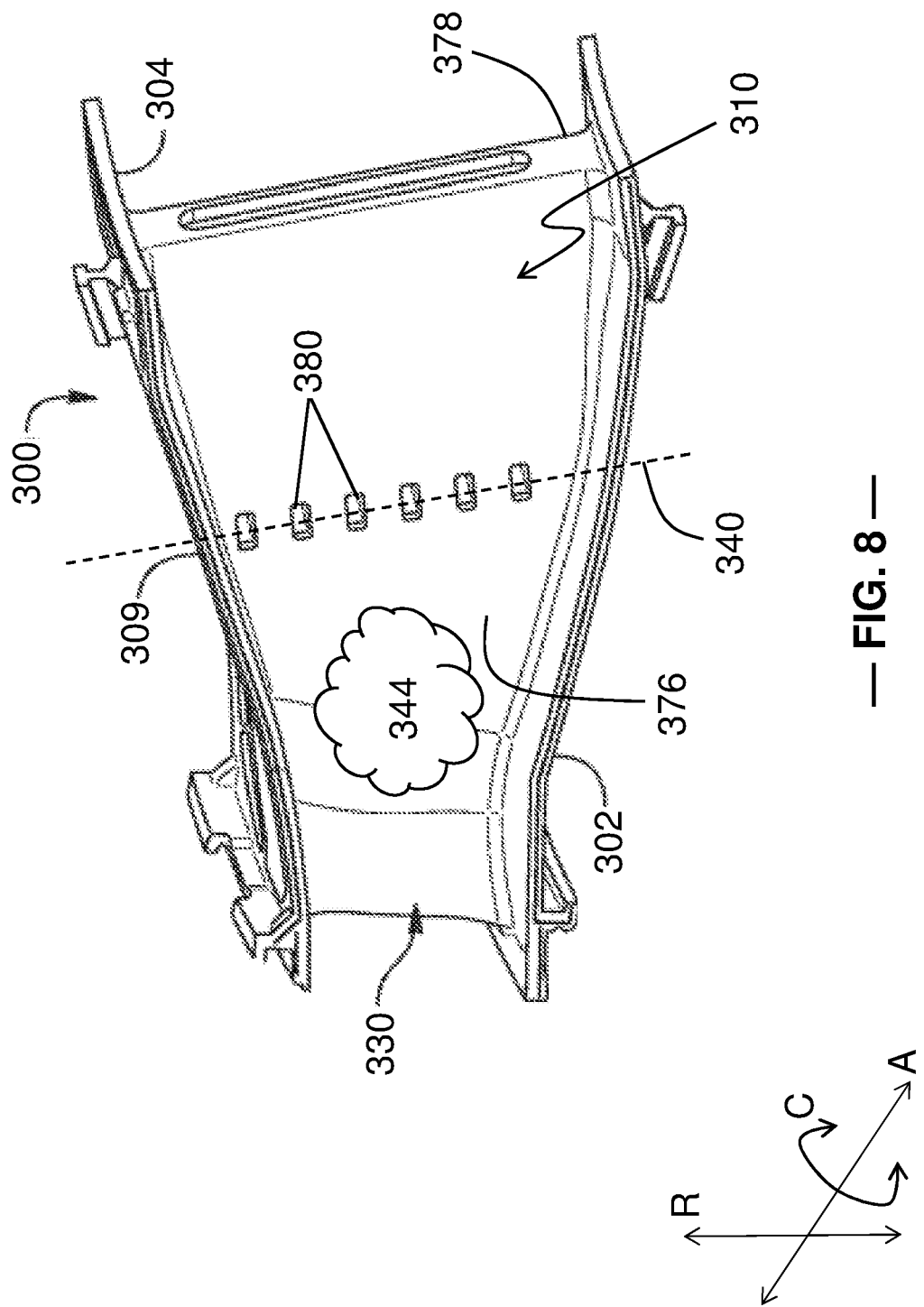
FIG. 8 is a side perspective view of an integrated combustor nozzle (ICN) used in the segmented annular combustor of FIG. 7.

The combustion section 16 may include a plurality of can-annular combustors 40 that are arrayed circumferentially about the shaft 22, one of which is schematically illustrated in FIGS. 5 and 6. Alternately, the combustion section 16 may include a segmented annular combustor 70, as illustrated in FIGS. 7 and 8.

FIGS. 5 and 6 illustrate a can-annular combustor 17, in which a representative fluid mixing apparatus 200 is installed. The can-annular combustor 17 includes a combustor liner 40 that defines an annulus 42 through which combustion products 30 travel to the turbine 18 (FIG. 3). One or more fuel nozzles 50 are disposed at an upstream end of the combustor 17. Each fuel nozzle 50 may be fueled, via a fuel supply line 52, that extends through an end cover 54 that defines a forward boundary of the combustor 17. The downstream end of the fuel nozzles 50 may be supported by a cap assembly (not shown separately) that defines a boundary of an upstream combustion zone 44.

The combustor liner 40 is at least partially circumferentially surrounded by a flow sleeve 60, such that an annulus 62 is defined between the liner 40 and the flow sleeve 60. The flow sleeve 60 may include a plurality of openings 64 that allow compressed air 26 from the compressor 14 to flow from the combustor casing (not shown) into the annulus 62. Such air 26 may be used for cooling the liner 40 before being used for combustion. As a result of flowing through the openings 64, the pressure of the air in the annulus 62 is lower than the pressure of the air 226 flowing into the inlet end of the fluid mixing apparatus 200. Additionally, over the distance between the openings 64 and the fluid mixing apparatus 200, the air 26 absorbs heat from the liner 40 and becomes warmer.

Some of the lower pressure air 216 enters the first annular wall of the fluid mixing apparatus 200, where it is mixed with high-pressure air 226 and a third fluid (e.g., fuel) 236 (as shown in FIG. 3) to produce a fuel-air mixture 266 that is injected radially into the combustor liner 40 and that is combusted in a secondary combustion zone 46. The combustion products from the secondary combustion zone 46 are combined with the combustion products 30 from the first combustion zone 44, and the resulting hot gas stream flows through the aft frame 68 to the turbine 18.

Although only one fluid mixing apparatus 200 is illustrated, it should be appreciated that more than one fluid mixing apparatus 200 may be used in a single combustor 17. Where more than one fluid mixing apparatus 200 is used, the fluid mixing apparatuses 200 may be arranged in a single axial plane or in multiple axial planes.

FIG. 6 illustrates an alternate placement of the fluid mixing apparatus 200 in the can-annular combustor 17. Namely, the fluid mixing apparatus 200 is moved axially downstream toward the aft frame 68 of the combustor 17. As described above, the first annular wall 210 may be mounted to the combustor liner 40, while the second annular wall 220 and the nested third annular wall 230 are mounted to the flow sleeve 60. The high-pressure air 226 flowing through the mixing conduit 250 (FIG. 3) and into the main passage 212 promotes mixing of the high-pressure air stream 226, the low-pressure air stream 216 (from the annulus 62), and the fuel 236.

FIG. 7 provides an upstream (i.e., an aft-looking-forward) view of the combustion section 16, according to an alternate embodiment of the present disclosure. As shown in FIG. 7, the combustion section 16 may be an annular combustion system and, more specifically, a segmented annular combustor 70 in which an array of integrated combustor nozzles 300 are arranged circumferentially about an axial centerline 38 of the gas turbine 10. The axial centerline 38 may be coincident with the gas turbine shaft 22. The segmented annular combustion system 70 may be at least partially surrounded by an outer casing 34, sometimes referred to as a compressor discharge casing. The compressor discharge casing 34, which receives compressed air 26 from the compressor 14 (FIG. 4), may at least partially define a high-pressure air plenum 36 that at least partially surrounds various components of the combustor 70. The compressed air 26 is used for combustion, as described above, and for cooling combustor hardware.

The segmented annular combustor 70 includes a circumferential array of integrated combustor nozzles 300, one of which is shown in FIG. 8. Each integrated combustor nozzle 300 includes an inner liner segment 302, an outer liner segment 304 radially separated from the inner liner segment 302, and a hollow or semi-hollow fuel injection panel 310 extending radially between the inner liner segment 302 and the outer liner segment 304, thus generally defining an "I"-shaped assembly. The fuel injection panels 310 separate the combustion chamber into an annular array of fluidly separated combustion zones.

At the upstream end of the segmented annular combustor 70, a fuel injection module 320 extends circumferentially between each pair of the panels 310 and radially between the inner liner segment 302 and the outer liner segment 304. The fuel injection modules 320 introduce a fuel/air mixture into a circumferential array of upstream combustion zones, via one or more burners, swirling fuel nozzles (swozzle), or bundled tube fuel nozzles. Each fuel injection module 320 has at least one fuel conduit supplying the fuel injection modules 320, which, for illustrative purposes, is represented by a circle. To achieve greater operational range (e.g., turn-down) and lower emissions, the panels 310 also introduce fuel in one or more secondary combustion zones 344 downstream of the combustion zones created by the injection of the fuel/air mixtures delivered by the fuel injection modules 320.

FIG. 8 illustrates a single integrated combustor nozzle 300. The hollow or semi-hollow panel 310 extends radially between the inner liner segment 302 and the outer liner segment 304. The panel 310 terminates in a turbine nozzle portion 320, which replaces the first stage nozzle in the turbine section 18. The turbine nozzle portion 320 turns and accelerates the flow of combustion gases 30 entering the turbine section 18. Thus, the integrated combustor nozzle 300 (a combination of a combustor liner and a turbine nozzle) has a pressure side wall 376 and a suction side wall 378, corresponding to the pressure side and the suction side of the turbine nozzle 330. The inner and/or outer liner segments 302, 304 may be provided with impingement panels 309 to promote cooling, if so desired.

Each panel 310 (also described as a "fuel injection panel") includes a plurality of radially spaced injection outlets 380 defined along each of the pressure side 376 and the suction side 378. FIGS. 9 through 20 illustrate various aspects of fluid mixing apparatuses 400, 500 that may be installed within the fuel injection panel 310 for delivery of a fuel-air mixture through the injection outlets 380.

The injection outlets 380 on the pressure side of a first integrated combustor nozzle 300 are arranged along a common injection plane 340, while the injection outlets on the suction side of an adjacent second integrated combustor nozzle 300 are arranged along a common injection plane, which may be axially staggered from the injection plane 340.

More details about integrated combustor nozzles may be found, for example, in co-pending U.S. patent application Ser. No. 15/464,394 and U.S. patent application Ser. No. 16/012,412.

Figure 18:
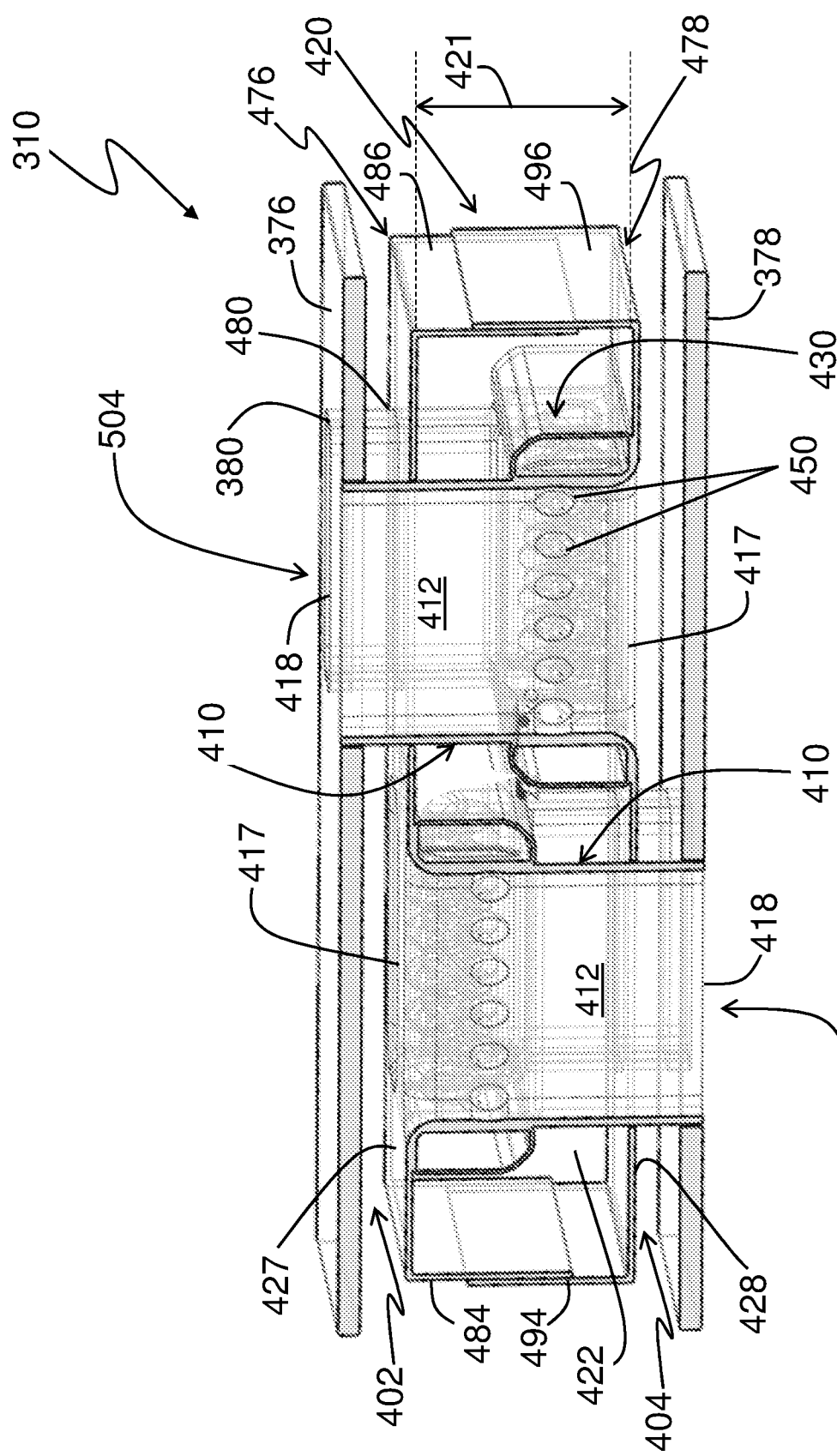
FIG. 18 is a side perspective view of the pair of fluid mixing apparatuses of FIG. 17.
Figure 19:
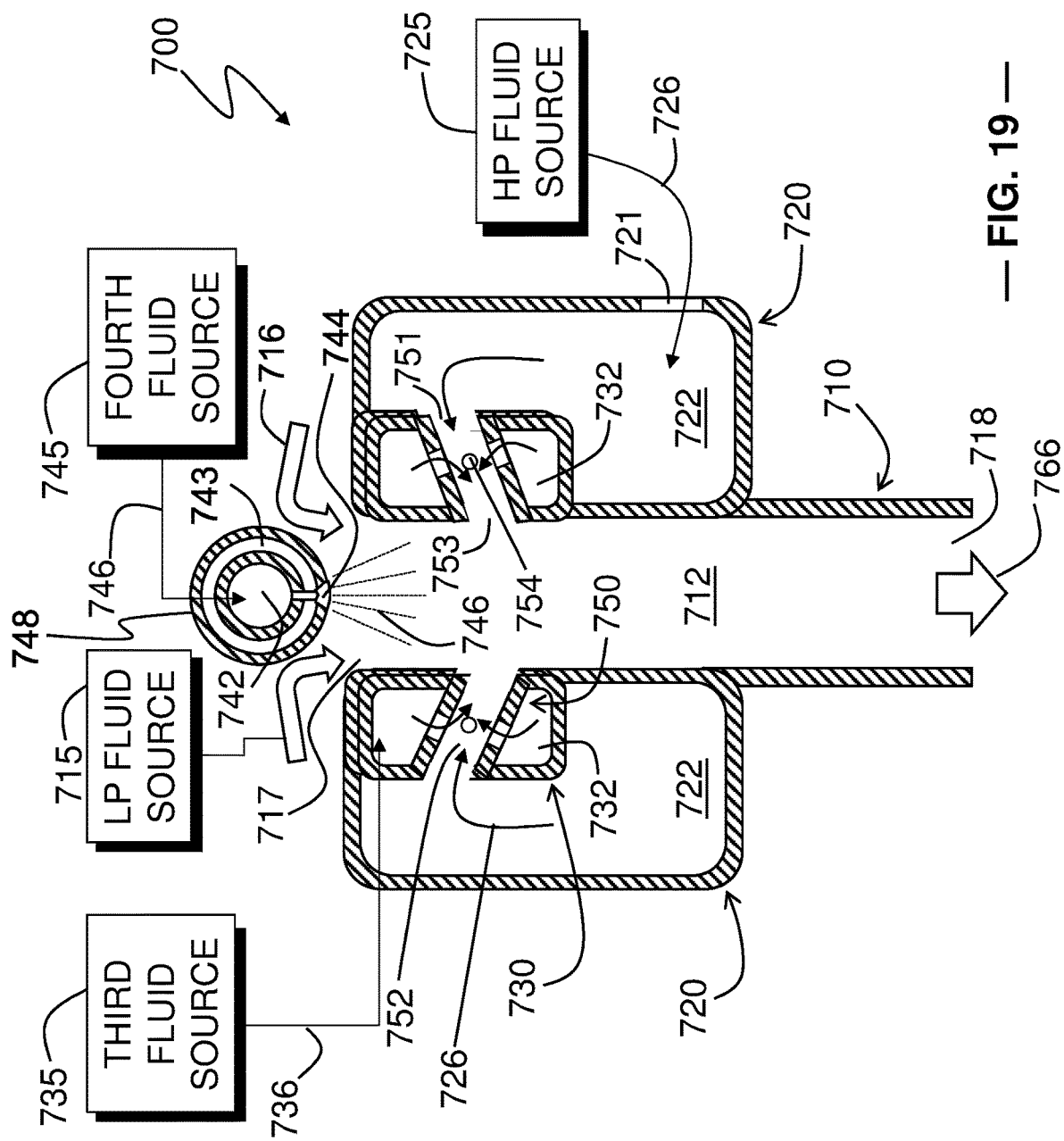
FIG. 19 is a schematic cross-sectional view of a fluid mixing apparatus for mixing four fluid streams, according to another aspect of the present disclosure.

FIG. 9 illustrates one portion 502 of a fluid mixing assembly 500, as may be installed in the fuel injection panel 310 of the integrated combustor nozzle 300 of FIGS. 7 and 8. The illustrated portion 502 is one exemplary half of the fluid mixing assembly 500. The complete fluid mixing assembly 500 is shown in FIGS. 17 through 19.

As shown in FIGS. 9 through 16, the illustrated portion 502 includes two fluid mixing apparatuses 400, although the fluid mixing assembly 500 may include two radial columns having any number of fluid mixing apparatuses 400 necessary to span the distance between the radially inner liner segment 302 and the radially outer liner segment 304 of the integrated combustor nozzle 300, as shown in FIGS. 7 and 8. In one embodiment, the fluid mixing apparatuses 400 are uniformly spaced between the inner liner segment 302 and the outer liner segment 304, although non-uniform spacing may be used in other embodiments.

The portion 502 includes a number of fluid mixing apparatuses 400 that are radially stacked relative to one another. Each fluid mixing apparatus 400, which is similar to the fluid mixing apparatus 200 of FIG. 2, includes a first annular wall 410, a second annular wall 420, and a third annular wall 430. The third annular wall 430 circumscribes an inlet end of the first annular wall 410, and the second annular wall 420 circumscribes both the first annular wall 410 and the third annular wall 430.

The first annular wall 410 of each fluid mixing apparatus 400 has an outlet 418 that aligns with a respective injection outlet 380 in the fuel injection panel 310 of the integrated combustor nozzle 300. The third annular wall 430 defines one or more fluid plenums 432, 442 for receipt of a third fluid (e.g., fuel) and/or a fourth fluid (e.g., fuel) from fluid manifolds 439, 449 coupled to fluid delivery conduits 437, 447.

A high-pressure plenum 422 (FIG. 11) is defined by the second annular wall 420 that surrounds the first annular wall 410 and the third annular wall 430. The second annular wall 420 includes a first wall segment 424, a second wall segment 425 axially spaced from the first wall segment 424, a third wall segment 427 extending axially between the first wall segment 424 and the second wall segment 425, and a fourth wall segment 428 (FIG. 11) opposite the third wall segment 427 and extending axially between the first wall segment 424 and the second wall segment 425.

Mixing conduits 450 (FIG. 11) extend through the fluid plenums 432, 442 and provide fluid communication between the high-pressure plenum 422 and a main plenum 412 (FIG. 11) defined by the first annular wall 410. The inlets 451 to the mixing conduits 450 are visible in FIG. 9.

FIG. 10 provides a plan view of the portion 502 of the fluid mixing assembly 500 shown in FIG. 9. The fluid mixing apparatuses 400 extend outwardly from the third wall segment 427. The fluid delivery conduit 437 is coupled to a fluid manifold 439 at one end of the third annular wall 430 and supplies a third fluid (e.g., a gaseous fuel) to one of the fluid mixing apparatuses 400. In the exemplary embodiment illustrated in FIGS. 9 through 16, the fluid manifold 439 is fluidly coupled to the lower of the two fluid mixing apparatuses 400 (as shown in FIG. 12). The fluid delivery conduit 447 is coupled to a fluid manifold 449 at an end of the third annular wall 430 opposite the fluid manifold 439 and supplies a fourth fluid (e.g., a gaseous fuel) to one of the fluid mixing apparatuses 400. In the exemplary embodiment shown in FIG. 13, the fluid manifold 449 is fluidly coupled to the upper of the two fluid mixing apparatuses 400.

The fluid delivery conduits 437, 447 may provide the same fuel to all fluid mixing apparatuses 400 in the fluid mixing assembly 500 (that is, the third fluid is the same as the fourth fluid). Alternately, the fluid delivery conduits 437 may provide a first fluid (fuel) to one or more of the fluid mixing apparatuses 400, while the fluid delivery conduit 447 may provide a second fluid (fuel) to one or more of the fluid mixing apparatuses 400, which may be different from the fluid mixing apparatuses 400 receiving the first fluid from the fluid delivery conduit 437. Thus, it is possible to fuel every other fluid mixing apparatus with a first fuel, while the remaining fluid mixing apparatuses 400 are fueled with a second fuel. The delivery may occur simultaneously or separately (for instance, if the second fuel is a back-up fuel).

In another alternative (not shown), the second annular wall 430 may be internally segmented to define a first fuel plenum 432 and a second fuel plenum 442. The first fuel plenum 432 may be located on the left side of the fluid mixing apparatus 400, while the second fuel plenum 442 is located on the right side of the fluid mixing apparatus 400. Alternately, the first fuel plenum 432 may be radially outward of the second fuel plenum 442. In either of these embodiments, the first fuel plenum 432 is fluidly coupled to the fluid manifold 439 fed by the third fluid conduit 437, while the second fuel plenum 442 is fluidly coupled to the fluid manifold 449 fed by the fourth fluid conduit 447. In another alternate embodiment (with reference to FIG. 17), the fluid mixing apparatuses 400 of the first portion 502 of the fluid mixing assembly 500 may be fueled from a third fuel supply (via the fluid delivery conduit 437 and fluid manifold 439), while the fluid mixing apparatuses 400 of the second portion 504 of the fluid mixing assembly 500 may be fueled from a fourth, different fuel supply (via the fluid delivery conduit 447 and fluid manifold 449). Various other permutations and combinations may also be envisioned by those of ordinary skill in the art.

As shown in FIGS. 9 and 10, a first portion 502 of the fluid mixing assembly 500 includes a radially oriented column of fluid mixing apparatuses 400 and a radially oriented column of wall openings 480. When a second portion 504 of the fluid mixing assembly 500 is joined with the first portion 502, as shown in FIGS. 17 through 19, the outlet ends 418 of the first annular walls 410 of the first portion 502 extend through wall openings 480 in the fourth wall segment 428 of the second annular wall 420; and the outlet ends 418 of the first annular walls 410 of the second portion 504 extend through wall openings 480 in the third wall segment 427 of the second annular wall 420.

FIG. 11 is a cross-sectional view of FIG. 10, as taken along section line A-A. As shown in FIG. 11, the outlet ends 418 of the first annular walls 410 extend downstream of the wall segment 428 proximate to the outlet ends 418. In this exemplary illustration, the first annular walls 410 of the fluid mixing apparatuses 400 in the first portion 502 have inlet ends 417 defined through the third wall segment 427, and outlet ends 418 that extend beyond the fourth wall segment 428.

FIG. 11 more clearly illustrates the third annular wall 430, the mixing conduits 450 that extend through the plenum 432 defined by the second annular wall 430 in the lower fluid mixing apparatus 400, and the mixing conduits 450 that extend through the plenum 442 defined in the second annular wall 430 of the upper fluid mixing apparatus 400. Each mixing conduit 450 has an inlet end 451 in fluid communication with the plenum 422 defined by the third annular wall 420.

Each mixing conduit 450 defines a passage 452 having an inlet 451 in fluid communication with the high-pressure plenum 422 and an outlet 453 in fluid communication with the main plenum 412. Each mixing conduit 450 further includes one or more injection holes 454 defined through the mixing conduit 450 and in fluid communication with the respective fluid plenum 432, 442 defined by the third annular wall 430. The inlet 451 of the mixing conduit 450 is disposed upstream of the outlet 453 of the mixing conduit 450, thus orienting the mixing conduit 450 at an angle relative to a centerline of the fluid mixing apparatus 400.

FIG. 12 is a cross-sectional view of FIG. 10, as taken along section line B-B. As shown in FIG. 12, the fluid delivery conduit 437 is fluidly coupled to the fluid manifold 439. In this exemplary embodiment, the fluid manifold 439 is in fluid communication with the plenum 432 of the lower fluid mixing apparatus 400. In other embodiments (not shown), the fluid manifold 439 may also be in fluid communication with the upper fluid mixing apparatus 400.

FIG. 13 is a cross-sectional view of FIG. 10, as taken along section line C-C. As shown in FIG. 13, the fluid delivery conduit 447 is fluidly coupled to the fluid manifold 449. In this exemplary embodiment, the fluid manifold 449 is in fluid communication with the plenum 442 of the upper fluid mixing apparatus 400. In other embodiments (not shown), the fluid manifold 449 may also be in fluid communication with the lower fluid mixing apparatus 400.

FIG. 14 is a cross-sectional view of one of the fluid mixing apparatuses 400, as taken along section line D-D of FIG. 11. The outlets 453 of each mixing conduit 450 are visible, along with injection holes 454 that are fluidly connected to the fuel plenum 432 (FIGS. 11 and 12). The plenum 432, 442 are supplied by the fluid manifolds 439, 449. The position of the third annular wall 430 (defining the fuel plenum 432) circumscribing the inlet end of the first annular wall 410 is apparent from FIG. 14. As a result, the mixing conduits 450 are disposed in closer proximity to the inlet 417 of the first annular wall 410 than to the outlet 418 of the first annular wall 410.

Figure 16:
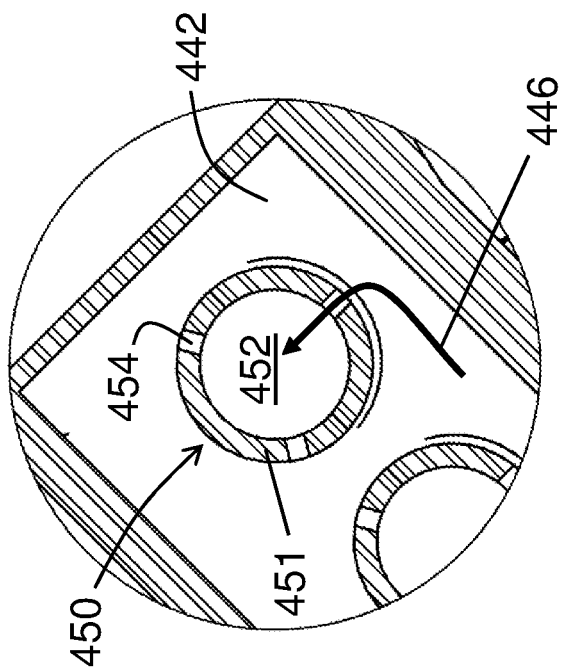
FIG. 16 is a stepped cross-sectional view of a mixing conduit of the fluid mixing apparatus of FIG. 9, as shown in FIG. 15.
Figure 15:
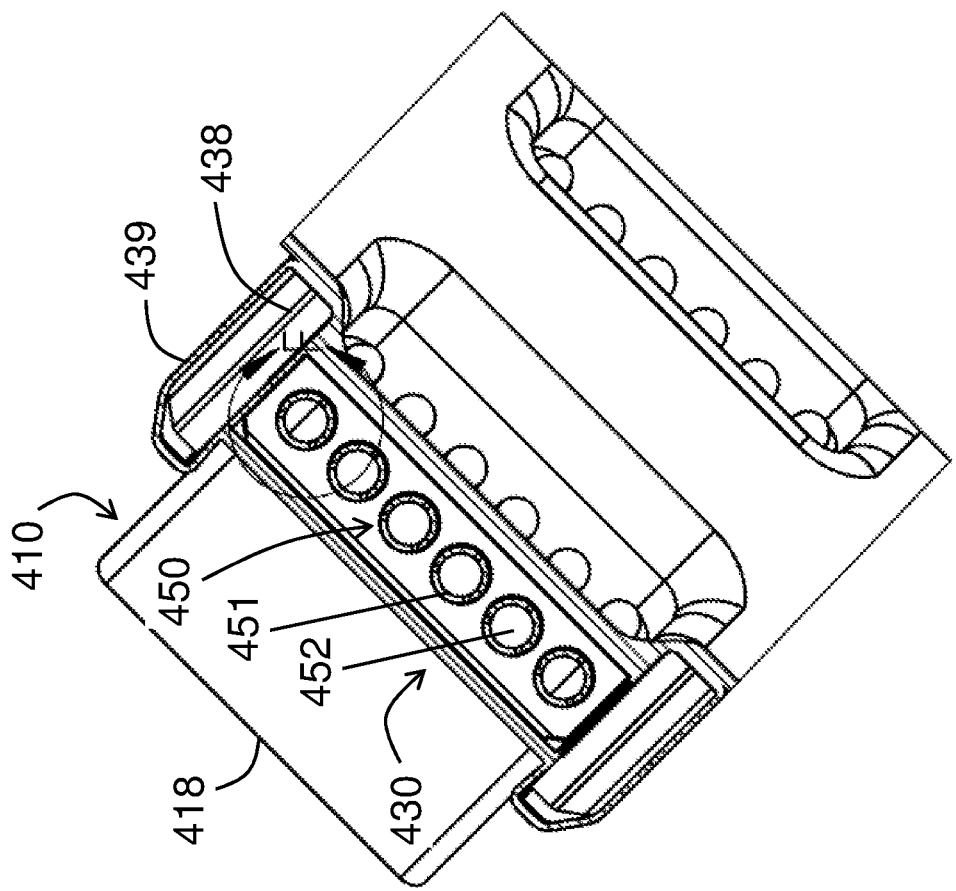
FIG. 15 is a stepped cross-sectional view of the fluid mixing apparatus of FIG. 9, as taken along line E-E of FIG. 11.

FIG. 15 is a stepped cross-sectional view of one of the fluid mixing apparatuses 400, as taken along section line E-E of FIG. 11, and FIG. 16 is a stepped view of one of the mixing conduits 450 enlarged from FIG. 15. As shown in FIG. 15, a partition 438 in the fluid manifold 439 prevents the fluid from the fluid manifold 439 from flowing into the plenum 442 (FIG. 11) defined by the third annular wall 430. While FIG. 15 illustrates the inlets 451 of a series of six mixing channels 450, it should be understood that other numbers of mixing conduits 450 may instead be used.

As shown in FIG. 16, the fourth fluid 446 flows from the fluid plenum 442 through injection holes 454 in the mixing conduit 450 and into the passage 452. The passage 452 delivers the fourth fluid 446 through the conduit outlet 453 (FIG. 11) to the main passage 412, where the fourth fluid 446 is mixed with the low-pressure fluid 416, the high-pressure fluid 426, and, optionally, the third fluid 436 (e.g., the same or a different gaseous fuel). Although three injection holes 454 are illustrated in each mixing conduit 450, it should be understood that other numbers of injection holes 454 may instead be used.

FIG. 17 is a cross-sectional perspective view of the fluid mixing assembly 500 having a first portion 502 with two fluid mixing apparatuses 400 (shown in a downwardly directed orientation) and a second portion 504 with two fluid mixing apparatuses 400 (shown in an upwardly directed orientation), as installed within an exemplary fuel injection panel 310 of the integrated combustor nozzle 300. The fuel injection panel 310 includes the pressure side wall 376 and the suction side wall 378. The pressure side wall 376 is disposed radially outward of the third wall segment 427 of the second annular wall 420, thereby defining between the pressure side wall 376 and the third wall segment 427 a low-pressure plenum 402. Low-pressure fluid 416 flows through the low-pressure plenum 402 and enters the inlet 417 of the first annular wall 410 of each fluid mixing apparatus 400 of the first portion 502 of the fluid mixing assembly 500.

The suction side wall 378 is disposed radially outward of the fourth wall segment 428 of the second annular wall 420, thereby defining between the suction side wall 378 and the fourth wall segment 428 a low-pressure plenum 404. Low-pressure fluid 416 flows through the low-pressure plenum 404 and enters the inlet 417 of the first annular walls 410 of each fluid mixing apparatus 400 of the second portion 504 of the fluid mixing assembly 500.

High-pressure fluid 426 flows into a high-pressure plenum 422 that surrounds the fluid mixing apparatuses 400 of the first portion 502 and the second portion 504 of the fluid mixing assembly 500. As previously described, the high-pressure plenum 422 is defined by the first wall segment 424, the second wall segment 425 (not shown in this view), the third wall segment 427 (radially inward of the pressure side wall 376), and the fourth wall segment 428 (radially inward of the suction side wall 378). From the plenum 422, the high-pressure fluid 426 flows into the inlets 451 of the mixing conduits 450, which extend through the third annular walls 430 of the fluid mixing apparatuses 500.

The third fluid 436 (e.g., a gaseous fuel), which is provided to the plenum 432 by a fluid delivery conduit 437, flows through one or more injection holes 454 in the mixing conduits 450 and is conveyed with the high-pressure fluid 426 through the outlets 453 of the mixing conduits 450 into the main passage 412 defined by the first annular wall 410. The pressure of the high-pressure fluid 426 draws the low-pressure fluid 416 into and through the main passage 412 and promotes mixing of the low-pressure fluid 416, the high-pressure fluid 426, and the third fluid 436 into a mixed fluid stream 466.

Optionally, a fourth fluid 446 (e.g., a gaseous fuel) may be provided to the plenum 442 by the fluid delivery conduit 447, from which the fourth fluid 446 flows through one or more injection holes 454 in the mixing conduits 450. The fourth fluid 446 and the high-pressure fluid 426 are conveyed through the outlets 453 of the mixing conduits 450 into the main passage 412 defined by the first annular wall 410. The pressure of the high-pressure fluid 426 draws the low-pressure fluid 416 into the main passage 412 and promotes the mixing of the low-pressure fluid 416, the high-pressure fluid 426, and the fourth fluid 446 into a mixed fluid stream 466.

In one embodiment, the low-pressure fluid 416 may be air that has been previously used for impingement cooling of the pressure side wall 376 and/or the suction side wall 378. As a result of having been used for impingement cooling, the low-pressure fluid 416 may have a higher temperature (e.g., from 100° F. to 300° F. higher) and a lower pressure (e.g., from 1% to 3% lower) than the high-pressure fluid 426.

Because of the generally radial orientation of the integrated combustor nozzles 300 within the segmented annular combustor 70 (as shown in FIG. 7), the delivery of the mixed fluid stream 466 occurs in a generally circumferential direction relative to a centerline 38 of the segmented annular combustor. In the illustrated embodiment, the mixed fluid streams 466 are introduced from openings 380 in both the pressure side wall 376 and the suction side wall 378, thus resulting in fluid streams in a clockwise direction and a counter-clockwise direction. Alternately, or under some operating conditions, it may be desirable to fuel the fluid mixing apparatuses 400 with outlets 418 on the pressure side wall 376, while the fluid mixing apparatuses 400 with outlets 418 on the suction side wall 378 remain unfueled, or vice versa.

FIG. 18 provides an overhead perspective view of the fluid mixing assembly 500 installed within the fuel injection panel 310 of the integrated combustor nozzle 300 of FIG. 8. In this embodiment, the second annular wall 420 is made of two telescoping C-shaped panels, a pressure side panel 476 and a suction side panel 478 that nests arounds the pressure side panel 476. The pressure side panel 476 includes, in series, a first end wall segment 484, the third wall segment 427, and a second end wall segment 486. The suction side panel 478 includes, in series, a third end wall segment 494, the fourth wall segment 428, and a fourth end wall segment 496. The C-shaped panels 476, 478 are slidably engaged with one another to facilitate installation of the fluid mixing assembly 500.

To install the fluid mixing assembly 500 within the fuel injection panel 310 of the integrated combustor nozzle 300, the first portion 502 and the second portion 504 may be positioned alongside one another, such that the first end wall segment 484 is axially inboard of the third end wall segment 494, the second end wall segment 486 is axially inboard of the fourth end wall segment 496, and the outlets 418 of the first annular walls 410 are flush with, or substantially flush with, the respective third wall segment 427 or fourth wall segment 428. With this configuration, the width of the fluid mixing assembly 500 is sufficiently reduced to permit installation within the fuel injection panel 310 without the outlet ends 418 of the first annular walls 410 becoming snagged on the pressure side wall 376 or the suction side wall 378.

Once the fluid mixing assembly 500 is within the fuel injection panel 310 and the outlet ends 418 are aligned with the respective openings 380 in the pressure side wall 376 and the suction side wall 378, the pressure side panel 476 and the suction side panel 478 are pushed toward one another and away from the respective side walls 376, 378 of the fuel injection panel 310. When positioned for use, the outlet ends 418 extend into the openings 480, where the outlet ends 418 may be secured, for example, by welding.

In the installed configuration, the third wall segment 427 is spaced radially inward of, and apart from, the pressure side wall 376 to define the low-pressure plenum 402 therebetween; and the fourth wall segment 428 is spaced radially inward of, and apart from, the suction side wall 378 to define the low-pressure plenum 404 therebetween. The telescoped end wall segments 484, 494 and 486, 496 may be secured in position by welding or by mechanical attachment means, such as interlocking tabs, rivets, or other fasteners (not shown), thereby defining the high-pressure plenum 422. Each end wall segment 484, 486 extends radially inward from the third wall segment 427 over a distance that is more than half the radial height 421 of the high-pressure plenum 422. Likewise, each end wall segment 494, 496 extends radially inward from the fourth wall segment 428 over a distance that is more than half the radial height 421 of the high-pressure plenum 422.

FIG. 19 schematically illustrates a fluid mixing apparatus 700, according to yet another aspect of the present disclosure. The fluid mixing apparatus 700 includes a first annular wall 710 that defines a main passage 712 in fluid communication with a low-pressure fluid source 715. The first annular wall 710 has an upstream end that defines an inlet 717 for a low-pressure fluid 716 and a downstream end that defines an outlet 718 of the fluid mixing apparatus 700. The first annular wall 710 may be a cylinder or may have a radial cross-section defining a non-circular shape, such as an elliptical shape, a racetrack shape, or a polygonal shape (e.g., a rectangular shape).

A second annular wall 720 circumscribes at least an upstream end of the first annular wall 710 and defines a plenum 722 in fluid communication with a high-pressure fluid source 725. For example, a high-pressure fluid 726 from the high-pressure fluid source 725 may be directed through one or more apertures 721 in the second annular wall 720 to fill the plenum 722. In one embodiment, the low-pressure fluid 716 and the high-pressure fluid 726 are the same fluid.

A third annular wall 730 is nested within the plenum 722 and is surrounded by the second annular wall 720. The third annular wall 730 defines a plenum 732 in fluid communication with a third fluid source 735. The third annular wall 730 circumscribes the first annular wall 710.

Each of one or more mixing conduits 750, which extend through the plenum 732, has an inlet 751 that is fluidly connected to the plenum 722 and an outlet 753 that is fluidly connected with the main passage 712. One or more injection holes 754 are defined through each mixing conduit 750 and are in fluid communication with the plenum 732 defined by the third annular wall 730. The third fluid 736 flows through the one or more injection holes 754 into a passage 752 defined by each mixing conduit 750.

In one embodiment, the mixing conduits 750 are oriented at an angle relative to an axial centerline of the fluid mixing apparatus 700. Preferably, the mixing conduits 750 are oriented at an angle to direct the flow therethrough in a downstream direction (i.e., toward the outlet 718). The mixing conduits 750 (individually) are shorter and of smaller diameter than the first annular wall 710.

A fourth fluid 746 may be introduced into the inlet 717 of the main passage 712 by an insulated or actively cooled tube 740 installed upstream of the inlet 717. The insulated or actively cooled tube 740 is in fluid communication with a fourth fluid source 745 (e.g., a liquid fuel source). The insulated or actively cooled tube 740 includes an inner tube 742, which is surrounded by an outer tube 748 to define an annulus 743 around the inner tube 742. The annulus 743 may be in communication with a vacuum source, such that a vacuum is created within the annulus 743 to insulate the inner tube 742. Alternately, the annulus 743 may be in communication with a cooling fluid source (e.g., water) in a closed or open-loop system. In an open system, the cooling fluid is injected into the inlet 717 with the liquid fuel 745. As is well-known, insulating a tube containing a liquid fuel helps to prevent coking. The inner tube 742 may be provided with a notch- or other-shaped opening 744 oriented to create a spray of the fourth fluid 746 at the inlet 717 of the main passage 712 defined by the first annular wall 710.

In operation, the high-pressure fluid 726 from the high-pressure fluid source 725 flows through the plenum 722 and into the passages 752, while the third fluid 736 flows through the one or more injection holes 754 into the passages 752 and/or the fourth fluid 746 is sprayed into the inlet 717. The pressure of the high-pressure fluid 726 rapidly carries the third fluid 736 into the main passage 712 defined by the first annular wall 710, where the high-pressure fluid 726 draws the low-pressure fluid 716 (and, optionally, the fourth fluid 746) into the inlet 717 of the main passage 712. Within the main passage 712, the low-pressure fluid 716, the high-pressure fluid 726, and the third fluid 736 and/or the fourth fluid 746 are mixed to produce a mixed fluid stream 766 that exits from the outlet 718 of the fluid mixing apparatus 710.

Within a gas turbine combustor, such as those described herein, the first fluid may be low-pressure air, the second fluid may be high-pressure air, the third fluid may be a gaseous fuel, and the fourth fluid may be a liquid fuel. In an alternate embodiment, the fourth fluid may be a gaseous fuel that is the same as or different from the third fluid.

The fluid mixing apparatus 700 may operate in a co-fire mode, in which both the third fluid and the fourth fluid are introduced for combustion or may operate in a dual-fuel mode, in which the third fluid and the fourth fluid are delivered individually. In another embodiment, the third wall 730 defining the third plenum 732 and the mixing channels 750 may be omitted, and the insulated or actively cooled tube 740 may supply all the fuel for the fluid mixing apparatus 700.

Figure 20:
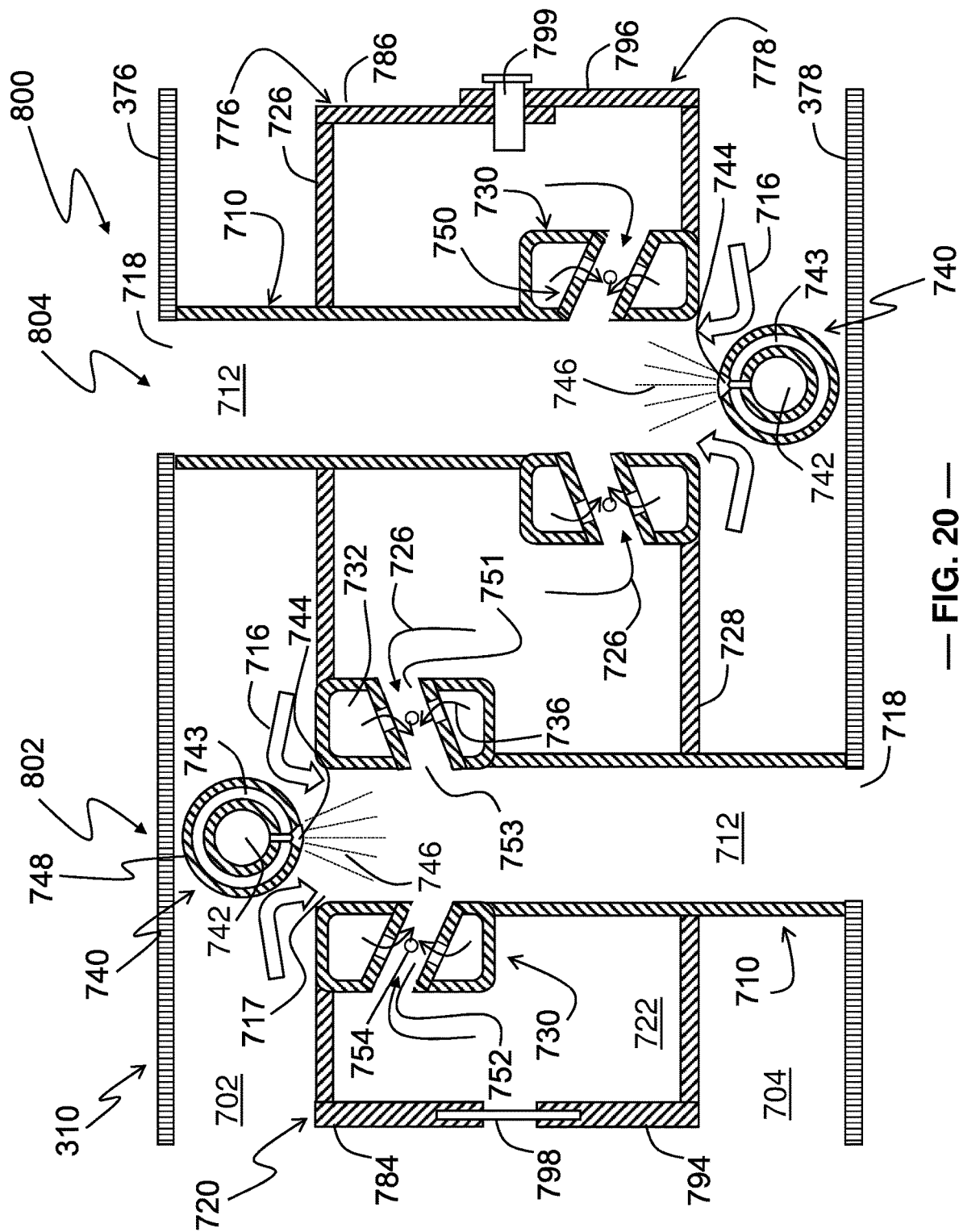
FIG. 20 is a schematic cross-sectional plan view of the fluid mixing apparatus of FIG. 19, as installed in the integrated combustor nozzle of FIG. 8.

FIG. 20 is a schematic cross-sectional plan view of the fluid mixing assembly 800 having a first portion 802 with a fluid mixing apparatus 700 (shown in a downwardly directed orientation) and a second portion 804 with a fluid mixing apparatus 700 (shown in an upwardly directed orientation), as installed within an exemplary fuel injection panel 310 of the integrated combustor nozzle 300. The fuel injection panel 310 includes the pressure side wall 376 and the suction side wall 378.

When the fluid mixing assembly 800 is installed within the fuel injection panel 310 of the integrated combustor nozzle 300, the pressure side wall 376 is disposed radially outward of the third wall segment 726 of the second annular wall 720, thereby defining between the pressure side wall 376 and the third wall segment 726 a low-pressure plenum 702. Low-pressure fluid 716 flows through the low-pressure plenum 702 and enters the inlet 717 of the first annular wall 710 of each fluid mixing apparatus 700 of the first portion 802 of the fluid mixing assembly 800.

The suction side wall 378 is disposed radially outward of the fourth wall segment 728 of the second annular wall 720, thereby defining between the suction side wall 378 and the fourth wall segment 728 a low-pressure plenum 704. Low-pressure fluid 716 flows through the low-pressure plenum 704 and enters the inlet 717 of the first annular walls 710 of each fluid mixing apparatus 700 of the second portion 804 of the fluid mixing assembly 800.

The second annular wall 720 produces a high-pressure plenum 722 that surrounds multiple fluid mixing apparatuses 700 (two of which are illustrated). In a configuration similar to that shown in FIG. 18, the second annular wall 720 includes two C-shaped panels, a pressure side panel 776 and a suction side panel 778 that is joined to the pressure side panel 776. The pressure side panel 776 includes, in series, a first end wall segment 784, a third wall segment 726, and a second end wall segment 786. The suction side panel 778 includes, in series, a third end wall segment 794, a fourth wall segment 728, and a fourth end wall segment 796. The C-shaped panels 776, 778 are slidably engaged with one another to facilitate installation of the fluid mixing assembly 800. As shown on the left side of FIG. 20, a seal 798 may be used to connect the first end wall segment 784 with the third end wall segment 794. Alternately, or additionally, to the seal 798, as shown on the right side of FIG. 20, a pin or rivet 799 may be used to connect the second end wall segment 786 with the fourth end wall segment 796. Other joining mechanisms may be used, as needs dictate.

High-pressure fluid 726 flows into the high-pressure plenum 722 that surrounds the fluid mixing apparatuses 700 of the first portion 802 and the second portion 804 of the fluid mixing assembly 800. From the plenum 722, the high-pressure fluid 726 flows into the inlets 751 of the mixing conduits 750, which extend through the third annular walls 730 of the fluid mixing apparatuses 700.

The third fluid 736 (e.g., a gaseous fuel), which is provided to the plenum 732 by a fluid delivery conduit (not shown), flows through one or more injection holes 754 in the mixing conduits 750 and is conveyed with the high-pressure fluid 726 through the outlets 753 of the mixing conduits 750 into the main passage 712 defined by the first annular wall 710. The pressure of the high-pressure fluid 726 draws the low-pressure fluid 716 into and through the main passage 712 and promotes mixing of the low-pressure fluid 716, the high-pressure fluid 726, and the third fluid 736.

In the present embodiment, a fourth fluid 746 (e.g., a liquid fuel or a liquid fuel-water emulsion) may be introduced into the inlet 717 of the main passage 712 from an insulated or actively cooled tube 740 installed upstream of the inlet 717, as described above. The pressure of the high-pressure fluid 726 draws the low-pressure fluid 716 and the fourth fluid 746 into the main passage 712 and promotes the mixing of the low-pressure fluid 716, the high-pressure fluid 726, and the fourth fluid 746.

In one embodiment, the low-pressure fluid 716 may be air that has been previously used for impingement cooling of the pressure side wall 376 and/or the suction side wall 378. As a result of having been used for impingement cooling, the low-pressure fluid 716 may have a higher temperature (e.g., from 100° F. to 300° F. higher) and a lower pressure (e.g., from 1% to 3% lower) than the high-pressure fluid 726.

Figure 21:
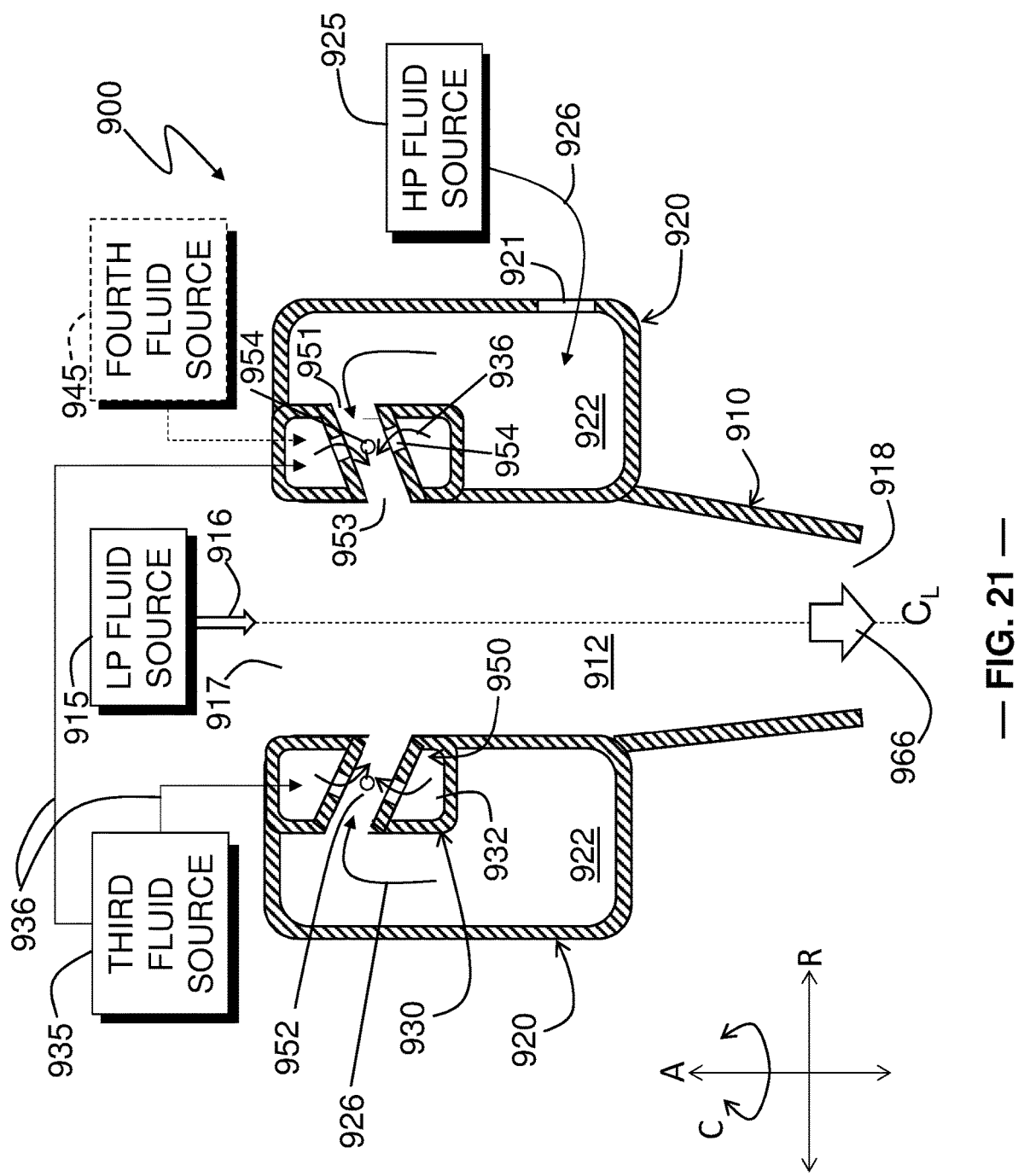
FIG. 21 is a schematic cross-sectional view of a fluid mixing apparatus for mixing at least three fluid streams, according to another aspect of the present disclosure.

FIG. 21 schematically illustrates a fluid mixing apparatus 900, according to yet another aspect of the present disclosure. The fluid mixing apparatus 900 includes a first annular wall 910 that defines a main passage 912 in fluid communication with a low-pressure fluid source 915. The first annular wall 910 has an upstream end that defines an inlet 917 for a low-pressure fluid 916 and a downstream end that defines an outlet 918 of the fluid mixing apparatus 900. The first annular wall 910 may be a cylinder or may have a radial cross-section defining a non-circular shape, such as an elliptical shape, a racetrack shape, or a polygonal shape (e.g., a rectangular shape). Unlike the first annular walls shown in the previous exemplary drawings, the first annular wall 910 tapers in diameter over at least a portion of its length toward the outlet 918. In the exemplary configuration, the varying cross-sectional area of the first annular wall 910 may accelerate the flow through the outlet 918.

A second annular wall 920 circumscribes at least an upstream end of the first annular wall 910 and defines a plenum 922 in fluid communication with a high-pressure fluid source 925. For example, a high-pressure fluid 926 from the high-pressure fluid source 925 may be directed through one or more apertures 921 in the second annular wall 920 to fill the plenum 922. In one embodiment, the low-pressure fluid 916 and the high-pressure fluid 926 are the same fluid.

A third annular wall 930 is nested within the plenum 922 and is surrounded by the second annular wall 920. The third annular wall 930 defines a plenum 932 in fluid communication with a third fluid source 935 and, optionally, a fourth fluid source 945. The third annular wall 930 circumscribes the first annular wall 910.

Each of one or more mixing conduits 950, which extend through the plenum 932, has an inlet 951 that is fluidly connected to the plenum 922 and an outlet 953 that is fluidly connected with the main passage 912. One or more injection holes 954 are defined through each mixing conduit 950 and are in fluid communication with the plenum 932 defined by the third annular wall 930. The third fluid 936 (and/or the fourth fluid) flows through the one or more injection holes 954 into a passage 952 defined by each respective mixing conduit 950.

In one embodiment, the mixing conduits 950 are oriented at an angle relative to an axial centerline $C_L$ of the fluid mixing apparatus 900. Preferably, the mixing conduits 950 are oriented at an angle to direct the flow therethrough in a downstream direction (i.e., toward the outlet 918). The mixing conduits 950 (individually) are shorter and of smaller diameter than the first annular wall 910.

In operation, the high-pressure fluid 926 from the high-pressure fluid source 925 flows through the plenum 922 and into the passages 952, while the third fluid 936 (and/or the fourth fluid 946) flows through the one or more injection holes 954 into the passages 952. The pressure of the high-pressure fluid 926 rapidly carries the third fluid 936 (and optionally the fourth fluid 946) into the main passage 912 defined by the first annular wall 910, where the high-pressure fluid 926 draws the low-pressure fluid 916 into the inlet 917 of the main passage 912. Within the main passage 912, the low-pressure fluid 916, the high-pressure fluid 926, the third fluid 936, and the optional fourth fluid 946 are mixed to produce a mixed fluid stream 966 that exits from the tapered outlet 918 of the fluid mixing apparatus 900.

Figure 22:
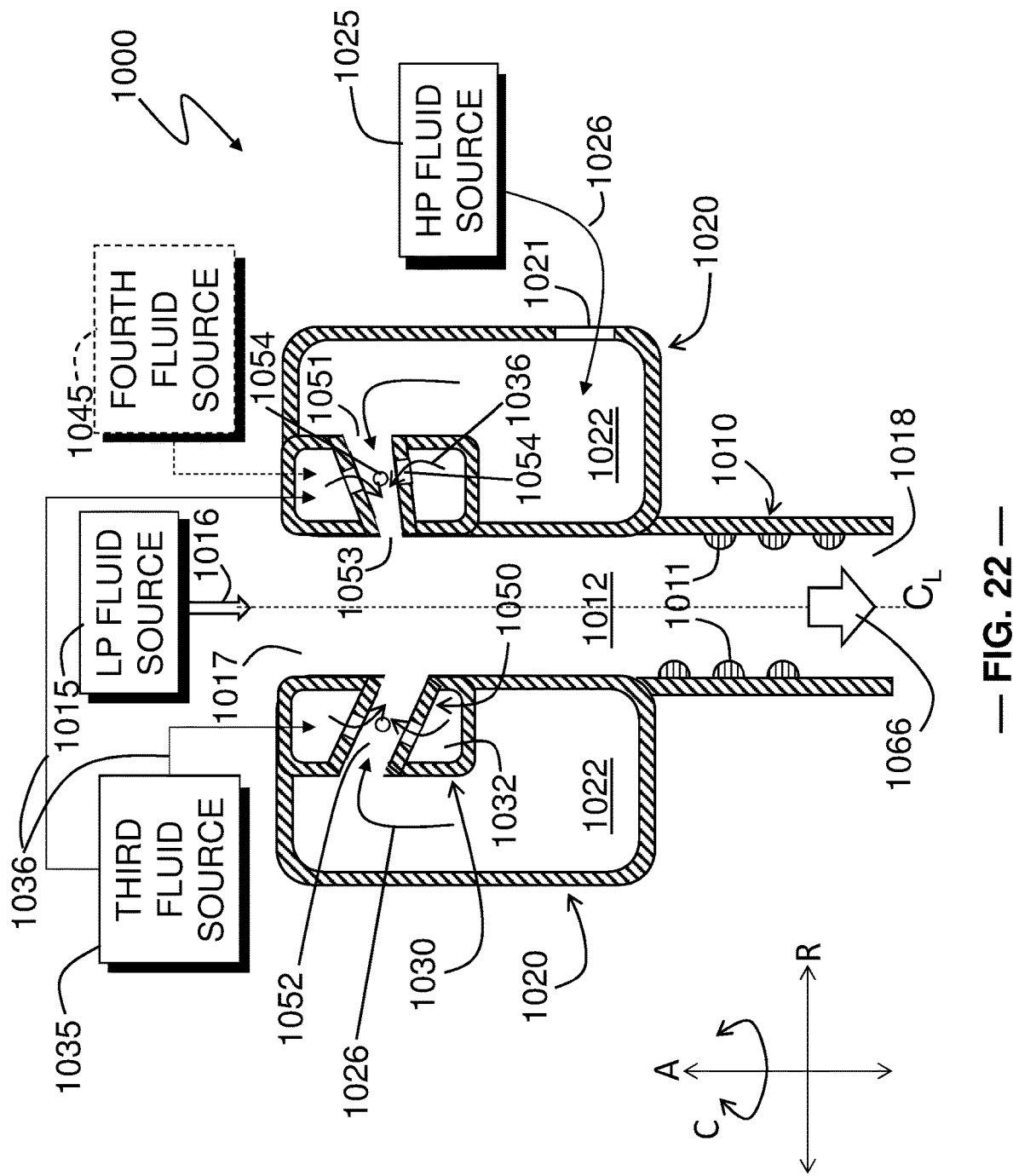
FIG. 22 is a schematic cross-sectional view of a fluid mixing apparatus for mixing at least three fluid streams, according to yet another aspect of the present disclosure.

FIG. 22 schematically illustrates a fluid mixing apparatus 1000, which illustrates additional aspects of the present disclosure. The fluid mixing apparatus 1000 includes a first annular wall 1010 that defines a main passage 1012 in fluid communication with a low-pressure fluid source 1015. The first annular wall 1010 has an upstream end that defines an inlet 1017 for a low-pressure fluid 1016 and a downstream end that defines an outlet 1018 of the fluid mixing apparatus 1000. The first annular wall 1010 may be a cylinder or may have a radial cross-section defining a non-circular shape, such as an elliptical shape, a racetrack shape, or a polygonal shape (e.g., a rectangular shape). Unlike the first annular walls shown in the previous exemplary drawings, which each have a smooth or uniform interior surface, the first annular wall 1010 is provided with a plurality of turbulators 1011 along a portion of its length (in the exemplary illustration, toward the outlet 1018) to promote mixing of the fluids, as described herein and below.

A second annular wall 1020 circumscribes at least an upstream end of the first annular wall 1010 and defines a plenum 1022 in fluid communication with a high-pressure fluid source 1025. For example, a high-pressure fluid 1026 from the high-pressure fluid source 1025 may be directed through one or more apertures 1021 in the second annular wall 1020 to fill the plenum 1022. In one embodiment, the low-pressure fluid 1016 and the high-pressure fluid 1026 are the same fluid.

A third annular wall 1030 is nested within the plenum 1022 and is surrounded by the second annular wall 1020. The third annular wall 1030 defines a plenum 1032 in fluid communication with a third fluid source 1035 and, optionally, a fourth fluid source 1045. The third annular wall 1030 circumscribes the first annular wall 1010.

Each of one or more mixing conduits 1050, which extend through the plenum 1032, has an inlet 1051 that is fluidly connected to the plenum 1022 and an outlet 1053 that is fluidly connected with the main passage 1012. One or more injection holes 1054 are defined through each mixing conduit 1050 and are in fluid communication with the plenum 1032 defined by the third annular wall 1030. The third fluid 1036 (and/or the fourth fluid 1046) flows through the one or more injection holes 1054 into a passage 1052 defined by each respective mixing conduit 1050.

In the illustrated embodiment, one or more of the mixing conduits 1050 has a cross-sectional area that varies from the inlet 1051 to the outlet 1053. In the exemplary illustration, the mixing conduit 1050 on the right side of the drawing (i.e., the mixing conduit 1050 optionally fed by the fourth fluid source 1045) tapers, or decreases in cross-sectional area, from the inlet 1051 to the outlet 1053. Other variations in cross-sectional area may be used, as needs dictate.

In one embodiment, the mixing conduits 1050 are oriented at an angle relative to an axial centerline $C_L$ of the fluid mixing apparatus 1000. Preferably, the mixing conduits 1050 are oriented at an angle to direct the flow therethrough in a downstream direction (i.e., toward the outlet 1018). The mixing conduits 1050 (individually) are shorter and of smaller diameter than the first annular wall 1010.

In operation, the high-pressure fluid 1026 from the high-pressure fluid source 1025 flows through the plenum 1022 and into the passages 1052, while the third fluid 1036 (and/or the fourth fluid 1046) flows through the one or more injection holes 1054 into the passages 1052. The pressure of the high-pressure fluid 1026 rapidly carries the third fluid 1036 (and optionally the fourth fluid 1046) into the main passage 1012 defined by the first annular wall 1010, where the high-pressure fluid 1026 draws the low-pressure fluid 1016 into the inlet 1017 of the main passage 1012. Within the main passage 1012, the low-pressure fluid 1016, the high-pressure fluid 1026, the third fluid 1036, and the optional fourth fluid 1046 are mixed to produce a mixed fluid stream 1066 that exits from the tapered outlet 1018 of the fluid mixing apparatus 1000.

Exemplary embodiments of the fluid mixing apparatuses and fluid mixing assemblies are described above in detail. The fluid mixing apparatuses and assemblies described herein are not limited to the specific embodiments described herein, but rather, components of the fluid mixing apparatuses may be utilized independently and separately from other components described herein. For example, the fluid mixing apparatuses described herein may have other applications not limited to practice with turbine nozzles for power-generating gas turbines, as described herein. Rather, the fluid mixing apparatuses described herein can be implemented and utilized in various other industries, where mixing of various fluids is needed. By way of example and not limitation, the first fluid may be a low-pressure water stream, the second fluid may be a high-pressure water stream, and the third fluid may be a water additive, such as a surfactant, a fire retardant, a dispersant, a foaming agent, and a water-miscible additive. One anticipated use of the present fluid mixing apparatus is to produce a fire-retardant foam to extinguish high-temperature (e.g., 1000° F.) jet fuel fires that may occur on airport runways.

While the technical advancements have been described in terms of various specific embodiments, those skilled in the art will recognize that the technical advancements can be practiced with modification within the spirit and scope of the claims.

What is claimed is:
1. A fluid mixing apparatus comprising:
  a first annular wall defining a first inlet, a first outlet, and a first passage extending between the first inlet and the first outlet, the first passage in fluid communication with a source of a first fluid at a first pressure;
  a second wall defining a first plenum in fluid communication with a source of a second fluid at a second pressure, wherein the first pressure is less than the second pressure;

a third wall defining a second plenum, wherein the third wall is at least partially surrounded by the second wall;

a mixing conduit extending through the second plenum and fluidly connecting the first plenum and the first passage;

a tube disposed upstream of the first inlet, the tube in fluid communication with a source of a third fluid and having an opening to distribute the third fluid from the tube;

wherein a flow of the second fluid through the mixing conduit draws a flow of the first fluid and a flow of the third fluid into and through the first passage to produce a mixture of the first fluid, the second fluid, and the third fluid, and wherein the mixture is delivered through the first outlet into a combustion zone of a combustor.

2. The fluid mixing apparatus of claim 1, wherein the first annular wall defining the first passage is oriented along a centerline of the fluid mixing apparatus; and wherein the second wall defining the first plenum circumscribes the first annular wall defining the first passage.

3. The fluid mixing apparatus of claim 1, wherein the second wall comprises a pair of telescoping C-shaped walls including a first C-shaped wall and a second C-shaped wall, each C-shaped wall having a first end wall segment, a second end wall segment opposite the first end wall segment, and a third wall segment extending between the first end wall segment and the second end wall segment; and wherein the first end wall segment of the first C-shaped wall is disposed outward of the first end wall segment of the second C-shaped wall; and wherein the second end wall segment of the first C-shaped wall is disposed outward of the second end wall segment of the second C-shaped wall.

4. The fluid mixing apparatus of claim 1, wherein the second plenum defined by the third wall is in fluid communication with a fourth fluid; and wherein the mixing conduit defines at least one injection hole in fluid communication with the second plenum and the second passage.

5. The fluid mixing apparatus of claim 4, wherein the flow of the second fluid through the mixing conduit draws a flow of the fourth fluid into the second passage to produce a premixture of the second fluid and the fourth fluid, the premixture being discharged through an outlet of the mixing conduit into the first passage.

6. The fluid mixing apparatus of claim 1, wherein the fluid mixing apparatus is installed between a pressure side wall and a suction side wall of an integrated combustor nozzle, the integrated combustor nozzle being part of a segmented annular combustor; and wherein the mixture of the first fluid, the second fluid, and the third fluid is directed in a substantially circumferential direction relative to a centerline of the segmented annular combustor.

7. The fluid mixing apparatus of claim 1, wherein the mixing conduit is disposed at an acute angle relative to a centerline of the first annular wall, such that an inlet of the mixing conduit is disposed radially upstream of an outlet of the mixing conduit.

8. The fluid mixing apparatus of claim 1, wherein the first passage defined by the first annular wall has a uniform cross-sectional shape from the first passage inlet to the first passage outlet.

9. The fluid mixing apparatus of claim 1, wherein the first passage defined by the first annular wall has a varying cross-section between the first passage inlet and the first passage outlet.

10. The fluid mixing apparatus of claim 1, wherein the mixing conduit is one of a plurality of mixing conduits.

11. The fluid mixing apparatus of claim 1, wherein the mixing conduit comprises a second passage inlet and a second passage outlet; and wherein a second passage defined by the mixing conduit has a uniform cross-sectional shape from the second passage inlet to the second passage outlet.

12. The fluid mixing apparatus of claim 1, wherein the mixing conduit comprises a second passage inlet and a second passage outlet; and wherein a second passage defined by the mixing conduit has a varying cross-section between the second passage inlet and the second passage outlet.

13. The fluid mixing apparatus of claim 1, wherein the at least one injection hole is a plurality of injection holes.

14. The fluid mixing apparatus of claim 1, wherein the first fluid and the second fluid are the same fluid.

15. The fluid mixing apparatus of claim 14, wherein the first fluid and the second fluid are low pressure air and high pressure air, respectively; and wherein the third fluid is a liquid fuel.

16. The fluid mixing apparatus of claim 15, wherein the second plenum defined by the third wall is in fluid communication with a fourth fluid, the fourth fluid being a gaseous fuel; and wherein the mixing conduit defines at least one injection hole in fluid communication with the second plenum and the second passage.

* * * * *